United States Patent
Ikegaya et al.

(10) Patent No.: US 7,330,946 B2
(45) Date of Patent: Feb. 12, 2008

(54) DATA PROCESSING SYSTEM

(75) Inventors: Naoko Ikegaya, Sagamihara (JP);
Katsuhisa Miyata, Yokohama (JP);
Masaaki Hosouchi, Zama (JP);
Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 291 days.

(21) Appl. No.: 11/183,090

(22) Filed: Jul. 15, 2005

(65) Prior Publication Data

US 2006/0265559 A1  Nov. 23, 2006

(30) Foreign Application Priority Data

May 18, 2005  (JP) ............................. 2005-145042

(51) Int. Cl.
*G06F 12/16* (2006.01)

(52) U.S. Cl. ................. 711/161; 711/154; 711/162; 711/165; 707/103 R; 707/103 Y; 707/201; 707/204

(58) Field of Classification Search ............. 711/154, 711/161, 162, 165; 707/130 R, 103 Y, 201, 707/204
See application file for complete search history.

(56) References Cited

U.S. PATENT DOCUMENTS

2003/0229764 A1  12/2003  Ohno et al. ................. 711/147
2004/0024979 A1*  2/2004  Kaminsky et al. ............ 711/162
2004/0148477 A1*  7/2004  Cochran ..................... 711/162
2006/0010299 A1*  1/2006  Zhang et al. ................ 711/162

* cited by examiner

*Primary Examiner*—Sanjiv Shah
*Assistant Examiner*—Daniel Kim
(74) *Attorney, Agent, or Firm*—Townsend and Townsend and Crew LLP

(57) ABSTRACT

The data processing system comprises at least one first storage system, and at least one second storage system connected to the first storage system. The second storage system receives change information identifying pre-change and post-change copy destination storage areas in a change process for changing a copy destination storage area of a target copy pair to another storage area of the second storage system; transmits the change information to the first storage system that has a copy source storage area in the target copy pair; and transmits copy information for the purpose of copying data between the pre-change and post-change copy destination storage areas. The first storage system refers to pair information identifying the copy pair, and transmits a copy of the data stored in a copy source storage area to the second storage system that has a copy destination storage area. The first storage system updates the pair information according to the change information received from the second storage system.

12 Claims, 21 Drawing Sheets

| PRIMARY VOLUME | | SECONDARY VOLUME | | COPY GROUP |
|---|---|---|---|---|
| STORAGE SYSTEM IDENTIFIER | VOLUME IDENTIFIER | STORAGE SYSTEM IDENTIFIER | VOLUME IDENTIFIER | GROUP IDENTIFIER |
| P1 | VOL1 | S1 | VOL1 | GRP1 |
| P1 | VOL2 | S1 | VOL2 | GRP1 |
| ⋮ | ⋮ | ⋮ | ⋮ | ⋮ |

| VOLUME IDENTIFIER | ATTRIBUTE |
|---|---|
| VOL1 | DATA |
| VOL2 | DATA |
| VOL3 | JNL |
| VOL4 | COMMAND |
| VOL5 | FREE |
| ⋮ | ⋮ |

| GROUP IDENTIFIER | JOURNAL VOLUME IDENTIFIER |
|---|---|
| GRP1 | VOL3 |
| ⋮ | ⋮ |

233P

| PRE-CHANGE SECONDARY VOLUME | | POST-CHANGE SECONDARY VOLUME | | GROUP INFORMATION |
|---|---|---|---|---|
| STORAGE SYSTEM IDENTIFIER | VOLUME IDENTIFIER | STORAGE SYSTEM IDENTIFIER | VOLUME IDENTIFIER | GROUP IDENTIFIER |
| S1 | VOL2 | S2 | VOL1 | GRP1 |

234S

| WRITE COMMAND RECEIVE TIME | ○○:××:△△ |
|---|---|
| GROUP IDENTIFIER | GRP1 |
| SEQUENCE NUMBER | 3 |
| PRIMARY VOLUME IDENTIFIER | VOL1 |
| WRITE DATA SIZE | ○○ |

280

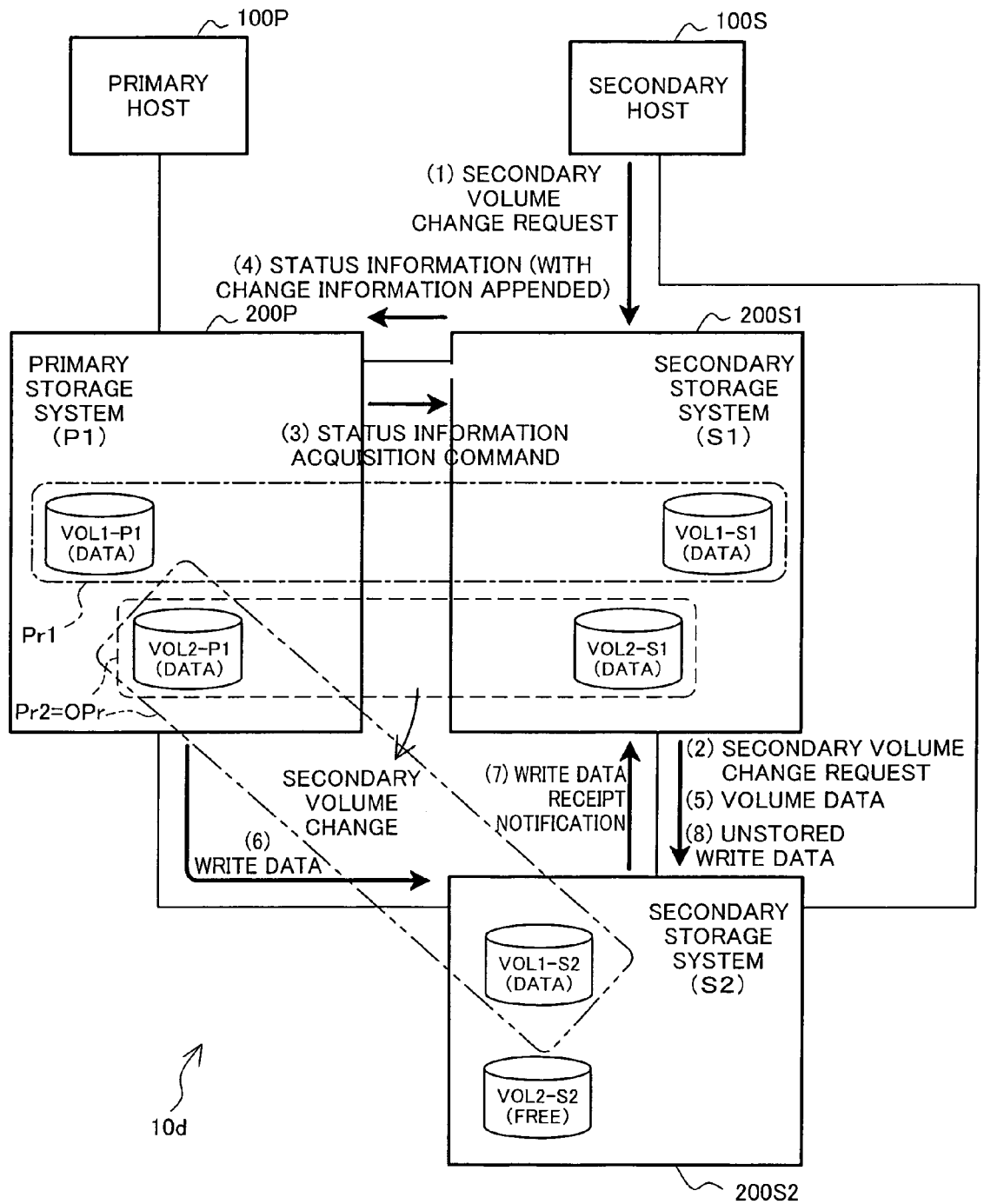

DATA PROCESSING SYSTEM

CROSS REFERENCE TO RELATED APPLICATIONS

The present application claims the priority based on Japanese Patent Application No. 2005-145042 filed on May 18, 2005, the disclosure of which is hereby incorporated herein by reference in its entirety.

BACKGROUND

The present invention relates to a data processing system, and relates in particular to technology for copying data among multiple storage systems belonging to a data processing system.

Technologies for carrying out remote copying in a data processing system that has a host computer and memory systems (e.g. storage systems) including storage areas are known (see JP2004-13367A, for example). Remote copying technology is a technology for copying data stored in a storage area included in one storage system in a data processing system to a storage area included in another storage system. Using remote copying technology, even if a failure should occur in storage system, it is possible for the tasks to be continued in the data processing system by using data stored in another storage system.

When performing remote copying, a copy pair composed of two storage areas included in different storage systems respectively is set. When data is written to one of the storage areas of the copy pair in accordance with a write request from the host computer, a copy of the written data is sent to the storage system having the other storage area and identical data is written to this other storage area as well.

In a data processing system that performs remote copying, there are cases in which one of the storage areas making up a copy pair is changed to another storage area. When changing a storage area making up a copy pair, the pre-change copy pair is deleted, a post-change copy pair is redefined, and initial copying between storage areas making up the post-change copy pair is executed. In the past, access to storage areas in the storage system was suspended by the host computer during the period of the change operation.

SUMMARY

An object of the present invention is to provide a technology making it possible, in a data processing system, to change a storage area making up a copy pair to another storage area without suspending access to storage areas within the storage system.

In one aspect of the present invention, there is provided a data processing system. The data processing system comprises at least one first storage system and at least one second storage system connected to the first storage system. Copying of data is carried out in a copy pair composed of one storage area as a copy source storage area belonging to the first storage system and one storage area as a copy destination storage area belonging to the second storage system. The second storage system includes a copy processing module, a change information receiving module, a change information transmitting module, a copy information transmitting module, and a change copy processing module. The copy processing module receives from the first storage system a copy of data stored in a copy source storage area and stores the received copy of data in a copy destination storage area in sequence matching storage sequence in the copy source storage area. The change information receiving module receives change information identifying pre-change and post-change copy destination storage areas in a change process for changing a copy destination storage area of a target copy pair that is one of the copy pairs to another storage area belonging to the second storage system. The change information transmitting module transmits the change information to the first storage system having a copy source storage area in the target copy pair. The copy information transmitting module transmits copy information including data stored in the pre-change copy destination storage area in order to perform copying of data between the pre-change and post-change copy destination storage areas in association with the change process. The change copy processing module performs copying of data between the pre-change and post-change copy destination storage areas using the transmitted copy information. The first storage system includes a copy transmitting module and a pair information updating module. The copy transmitting module transmits a copy of data stored in a copy source storage area in a copy pair to the second storage system having a copy destination storage area referring to pair information identifying the copy source storage area and the copy destination storage area in the copy pair. The pair information updating module updates the pair information according to the change information received from the second storage system.

With this data processing system, change information received by the second storage system is transmitted to the first storage system, whereupon pair information is updated by the first storage system. In the second storage system, copy information is transferred and copying of data between pre-change and post-change storage areas is carried out in association with the change process. Thus, in this data processing system, a storage area making up a copy pair can be changed to another storage area without suspending access to storage areas within the storage system.

These and other objects, features, aspects, and advantages of the present invention will become more apparent from the following detailed description of the preferred embodiments with the accompanying drawings.

BRIEF DESCRIPTION OF THE DRAWINGS

FIG. 26 is a diagram showing the outline of the secondary volume change process in the data processing system 10d in Embodiment 6.

DESCRIPTION OF THE PREFERRED EMBODIMENT

Next, aspects of the present invention will be described in the following order on the basis of embodiments. The present invention can be realized in various aspects. For example, the present invention can be realized in aspects such as a data processing system, a storage system, a computer, a computer system, a data processing method, a storage area change process method, a computer program for effecting the functions of such methods, devices, or systems, and on a recording medium for recording such computer program.

A. Embodiment 1

A-1. Arrangement of Data Processing System

A-2. Overview of Remote Copying in Data Processing System

A-3. Secondary Volume Change Process

B. Embodiment 2

C. Embodiment 3

D. Embodiment 4

E. Embodiment 5

F. Embodiment 6

G. Variations

A. Embodiment 1

A-1. Arrangement of Data Processing System

Figure 1:
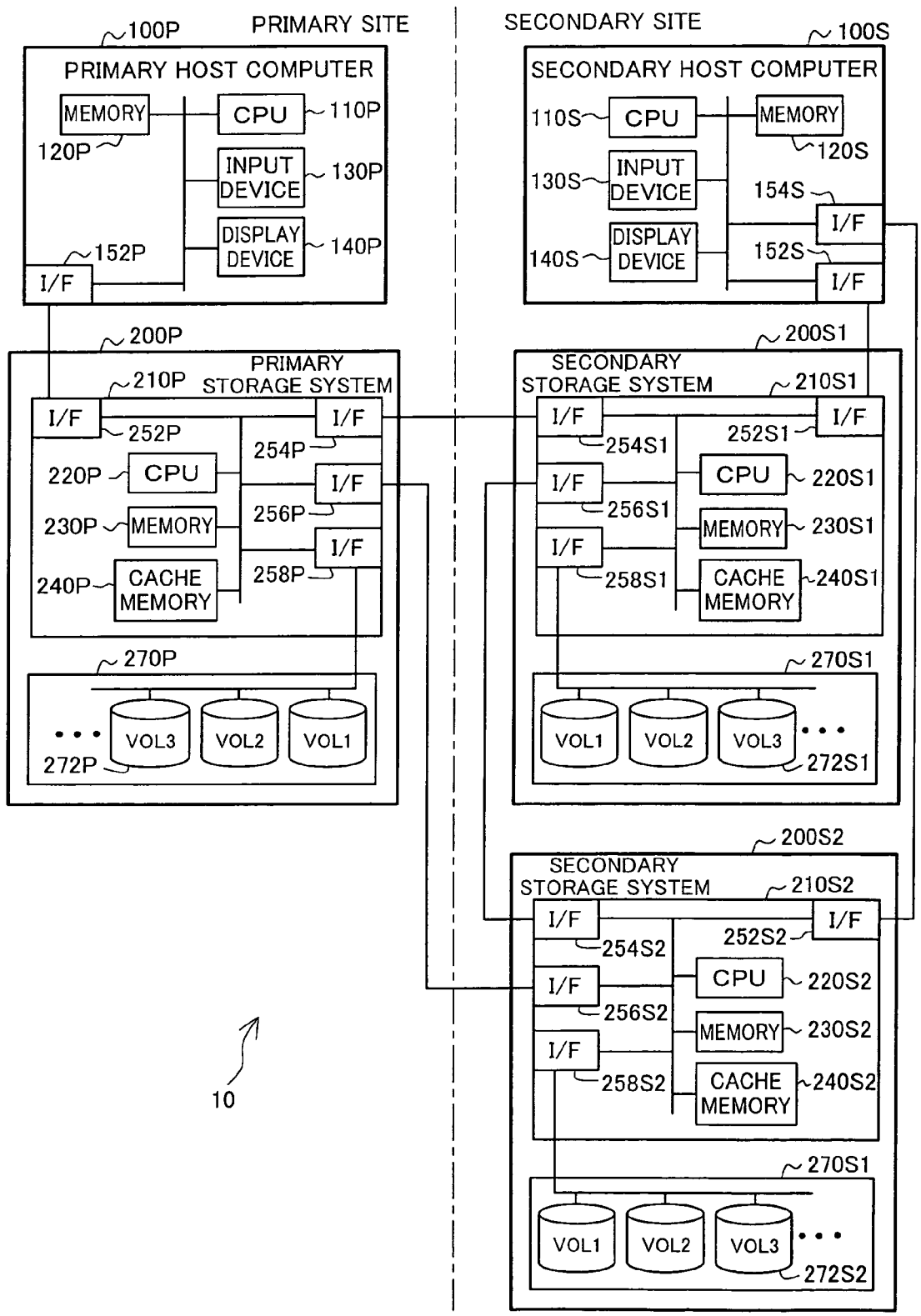
FIG. 1 is a block diagram showing an arrangement of a data processing system 10 in Embodiment 1 of the present invention.

FIG. 1 is a block diagram showing an arrangement of a data processing system 10 in Embodiment 1 of the present invention. The data processing system 10 in Embodiment 1 comprises two host computers 100 (100P, 100S) and three storage systems 200 (200P, 200S1, 200S2).

The host computer 100P and the storage system 200P are situated at a primary site. The host computer 100S and the storage systems 200S1 and 200S2 are situated at a secondary site. Here, "primary site" refers to a site where data processing tasks are mainly carried out, and "secondary site" refers to a site for storing copies of data used in data processing tasks at the primary site. The relationship between the primary site and the secondary site is reversible.

Herein, reference characters identifying the site at which elements, information, and programs are located are suffixed to symbols indicating the elements and the like in the data processing system 10. That is, a symbol of an element located at the primary site is suffixed by a "P", and one located at the secondary site is suffixed by an "S". Where multiple same elements are present at a same site, a serial number follows the reference characters identifying the site. For example, since two storage systems 200 are present at the secondary site, one of the storage systems 200 present at the secondary site is denoted as "storage system 200S1" and the other storage system is denoted as "storage system 200S2". Where it is not necessary to distinguish among identical individual elements, the site-identifying character and the serial number suffixed to the symbol are omitted as appropriate.

The host computer 100P at the primary site (hereinafter termed "primary host computer" or "primary host") is connected to the storage system 200P at the primary site (hereinafter "primary storage system"). The host computer 100S at the secondary site (hereinafter termed "secondary host computer" or "secondary host") is connected to each of the storage systems 200S1 and 200S2 at the secondary site (hereinafter termed "secondary storage systems"). The primary storage system 200P is connected to the secondary storage systems 200S1 and 200S2 respectively. The secondary storage systems 200S1 and 200S2 are also connected to one another.

The host computer 100 has a CPU 110, a memory 120, an input device 130, a display device 140, and interfaces (I/F) 152, 154 for connecting to the storage systems 200.

The storage system 200 has a storage controller 210 and a disk array 270. The storage controller 210 is a device for controlling the storage system 200, and has a CPU 220, a memory 230, a cache memory 240, an interface (I/F) 252 for connection to the host computer 100, an interface (I/F) 258 for connection to the disk array 270, and interfaces (I/F) 254 and 256 for connection to other storage systems 200.

The disk array 270 of the storage system 200 is a storage device including multiple disk devices, and has at least one volume 272. The volume 272 is a logical storage area for storing data and the like used in data processing tasks by the host computer 100. Typically, each volume 272 is formed by logical partitioning of a single logical storage area formed by multiple disk devices.

In the data processing system 10 of this embodiment, the primary host 100P executes data processing tasks while accessing the primary storage system 200P. Also, in the data processing system 10 of this embodiment, it is possible to carry out remote copying in order to store copy of data stored in the volume 272P of the primary storage system 200P in the volume 272S of the secondary storage system 200S. By means of this remote copying, it is possible to retain identical data in storage systems 200 situated at multiple sites, so that data reliability can be enhanced. The specifics of remote copying will be described later.

Figures 2, 3:
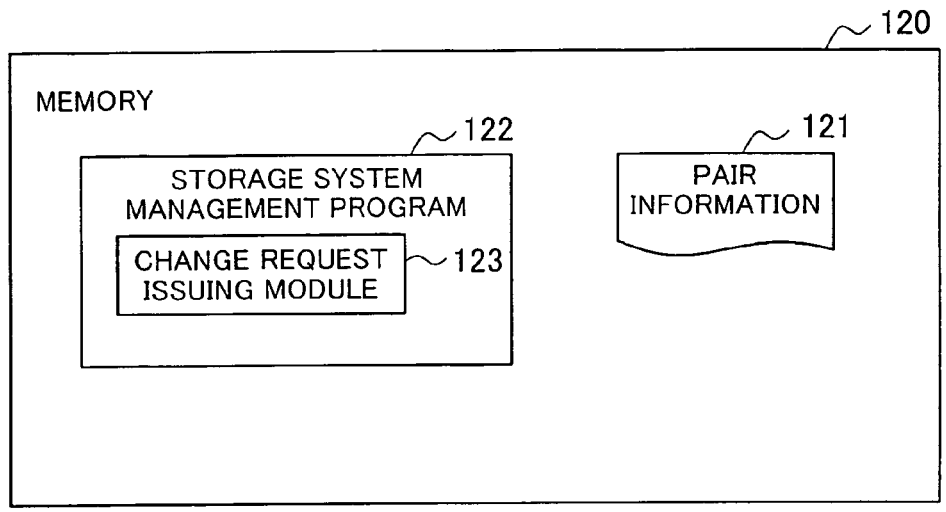
FIG. 2 is a diagram showing an internal arrangement of the memory 120 of the host computer 100.
FIG. 3 is a diagram showing an example of contents of pair information 121.

FIG. 2 is a diagram showing an internal arrangement of the memory 120 (FIG. 1) of the host computer 100. In the memory 120 of the host computer 100 are stored a storage system management program 122 and pair information 121. The CPU 110 (FIG. 1) of the host computer 100 reads out from memory 120 and executes the storage system management program 122, whereby the various functions and management of the storage systems 200, including remote copying settings and management, are carried out. The storage system management program 122 includes function as a change request issuing module 123. This function will be described in detail later. Function as the change request issuing module 123 may be included only in the storage system management program 122 of the secondary host 100S (FIG. 1).

FIG. 3 is a diagram showing an example of contents of pair information 121 (FIG. 2). Pair information 121 includes information defining all copy pairs set within the data processing system 10. Here, a copy pair denotes combination of two volumes 272 between which copying of data is carried out. That is, data stored in one of the volumes 272 making up a copy pair (termed a "primary volume") is copied to the other volume 272 (termed a "secondary volume").

As shown in FIG. 3, a copy pair is defined by means of identifying a primary volume and a secondary volume, with a storage system identifier that identifies a storage system 200 and a volume identifier that identifies a volume 272. In the example of FIG. 3, there is defined a copy pair having as a primary volume the volume 272 assigned the volume identifier "VOL1" in the storage system 200 assigned the storage system identifier "P1", and having as a secondary volume the volume 272 assigned the volume identifier "VOL1" in the storage system 200 assigned the storage system identifier "S1". In the example of FIG. 3, the storage system 200 whose storage system identifier is "P1" is denoted as the primary storage system 200P (FIG. 1), and the storage system 200 whose storage system identifier is "S1" is denoted as the secondary storage system 200S1 (FIG. 1).

As shown in FIG. 3, the pair information 121 includes information indicating a copy group to which a copy pair belongs. Copy groups are identified by group identifiers. Copy groups will be described in detail later.

In another embodiment of the pair information 121, a primary volume and a secondary volume may be identified by means of a storage controller identifier that identifies the storage controller 210 (FIG. 1) of a storage system 200, and a volume identifier. It is possible for a copy pair to be composed of two volumes 272 located separately on two storage systems 200, or to be composed of two volumes 272 within a single storage system 200.

Figures 4, 5:
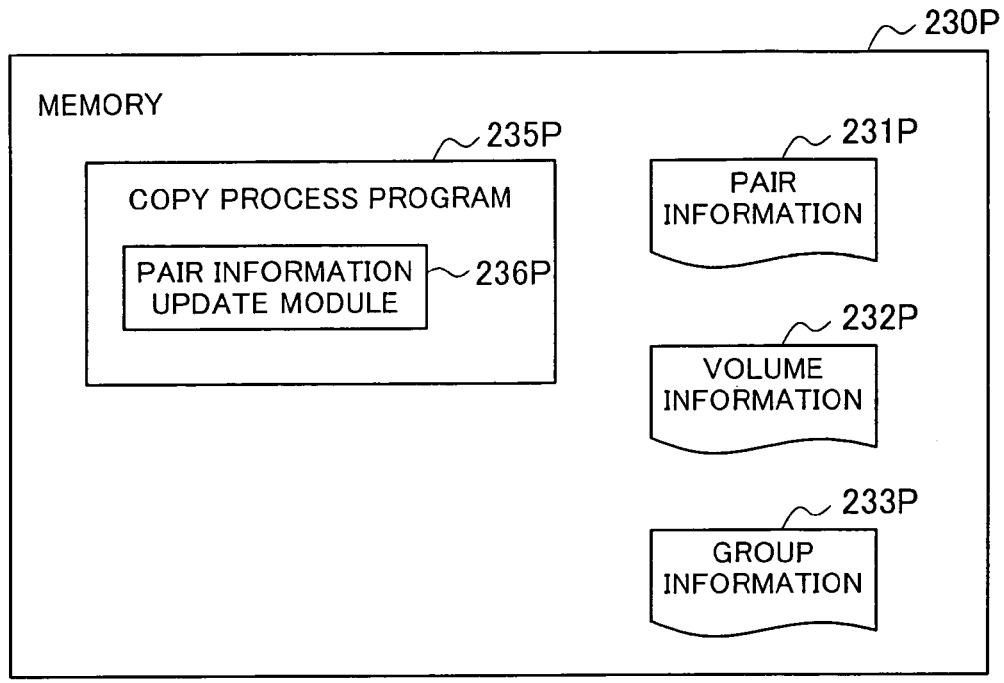
FIG. 4 is a diagram showing an internal arrangement of the memory 230P of the primary storage system 200P.
FIG. 5 is a diagram showing an example of contents of volume information 232P.

FIG. 4 is a diagram showing an internal arrangement of the memory 230P (FIG. 1) of the primary storage system 200P. In the memory 230P of the primary storage system 200P are stored a copy process program 235P, pair information 231P, volume information 232P, and group information 233P. The CPU 220P (FIG. 1) of the primary storage system 200P reads out from memory 230P and executes the copy process program 235P, in order to perform various processes associated with copying of data in a copy pair. The copy process program 235P includes function as a pair information updating module 236P. The specifics of this function will be described later.

The pair information 231P stored in the memory 230P of the primary storage system 200P has the same content as the pair information 121 stored in the memory 120 of the host computer 100 shown in FIG. 3.

FIG. 5 is a diagram showing an example of contents of volume information 232P (FIG. 4). The volume information 232P is information indicating an attribute established for each volume 272 belonging to the primary storage system 200P. Volumes 272 are identified by volume identifiers. In this embodiment, the attribute of a volume 272 is one of four kinds of attribute, namely, "data", "journal" (also denoted as "JNL"), "command" or "free." Of the attributes of volumes 272, "data" indicates that the volume 272 is a volume storing data for use in data processing tasks of the host computer 100. Similarly, "journal" indicates that the volume stores a journal, described later; "command" indicates that the volume stores a control request to a storage system 200; and "free" indicates that the volume has an attribute other than the three attributes mentioned above. In this specification, a volume 272 having the "data" attribute is termed a "data volume." Similarly, a volume 272 having the "journal" attribute is termed a "journal volume", and a volume 272 having the "free" attribute is termed a "free volume."

Figures 6, 7, 8:
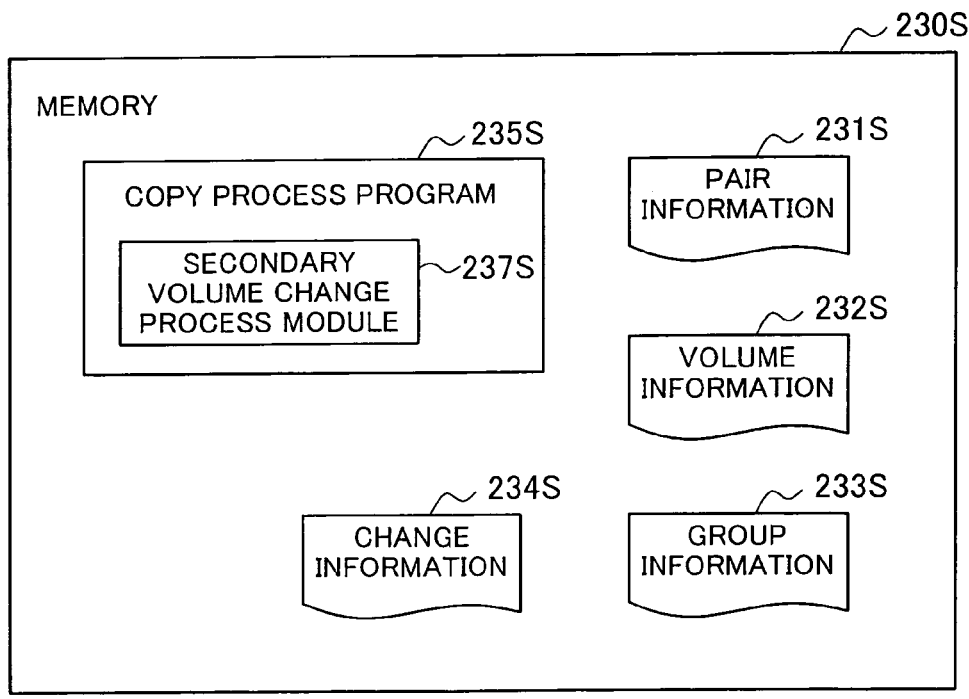
FIG. 6 is a diagram showing an example of contents of group information 233P.
FIG. 7 is a diagram showing an internal arrangement of the memory 230S of the secondary storage system 200S.
FIG. 8 is a diagram showing an example of contents of change information 234S.

FIG. 6 is a diagram showing an example of contents of group information 233P (FIG. 4). In this embodiment, as will be described later, each storage system 200 has one or more journal volumes prepared for each copy group. The group information 233P is information indicating correspondence between a copy group and a journal volume for use for the copy group. Copy groups are identified by group identifiers, and journal volumes are identified by volume identifiers.

FIG. 7 is a diagram showing an internal arrangement of the memory 230S (FIG. 1) of the secondary storage system 200S. In the memory 230S of the secondary storage system 200S are stored a copy process program 235S, pair information 231S, volume information 232S, and group information 233S. The CPU 220S (FIG. 1) of the secondary storage system 200S reads out from memory 230S and executes the copy process program 235S, in order to perform various processes associated with copying of data in a copy pair. The copy process program 235S includes function as a secondary volume change process module 237S. The specifics of this function will be described later.

The pair information 231S stored in the memory 230S of the secondary storage system 200S has similar content to the pair information 121 stored in the memory 120 of the host computer 100 shown in FIG. 3. The volume information 232S and group information 233S have similar content to the volume information 232P and group information 233P stored in the memory 230P of the primary storage system 200P shown in FIG. 5 and FIG. 6.

In the course of secondary volume change process, described later, change information 234S is also stored in the memory 230S of the secondary storage system 200S. FIG. 8 is a diagram showing an example of contents of change information 234S. The change information 234S is information identifying pre-change and post-change secondary volumes in the secondary volume change process. In the change information 234S, the pre-change and post-change secondary volumes are identified by means of a storage system identifier and a volume identifier. In the example of FIG. 8, the secondary volume of a copy pair targeted for the secondary volume change process is changed from the volume 272 whose volume identifier is "VOL2" belonging to the storage system 200 whose storage system identifier is "S1", to the volume 272 whose volume identifier is "VOL1" belonging to the storage system 200 whose storage system identifier is "S2." In the example of FIG. 8, the storage system 200 whose storage system identifier is "S1" represents the secondary storage system 200S1 (FIG. 1), and the storage system 200 whose storage system identifier is "S2" represents the secondary storage system 200S2 (FIG. 1).

As shown in FIG. 8, the change information 234S also includes group identifiers indicating a copy group to which the copy pair targeted for the secondary volume change process belongs.

A-2. Overview of Remote Copying in Data Processing System

Figure 9:
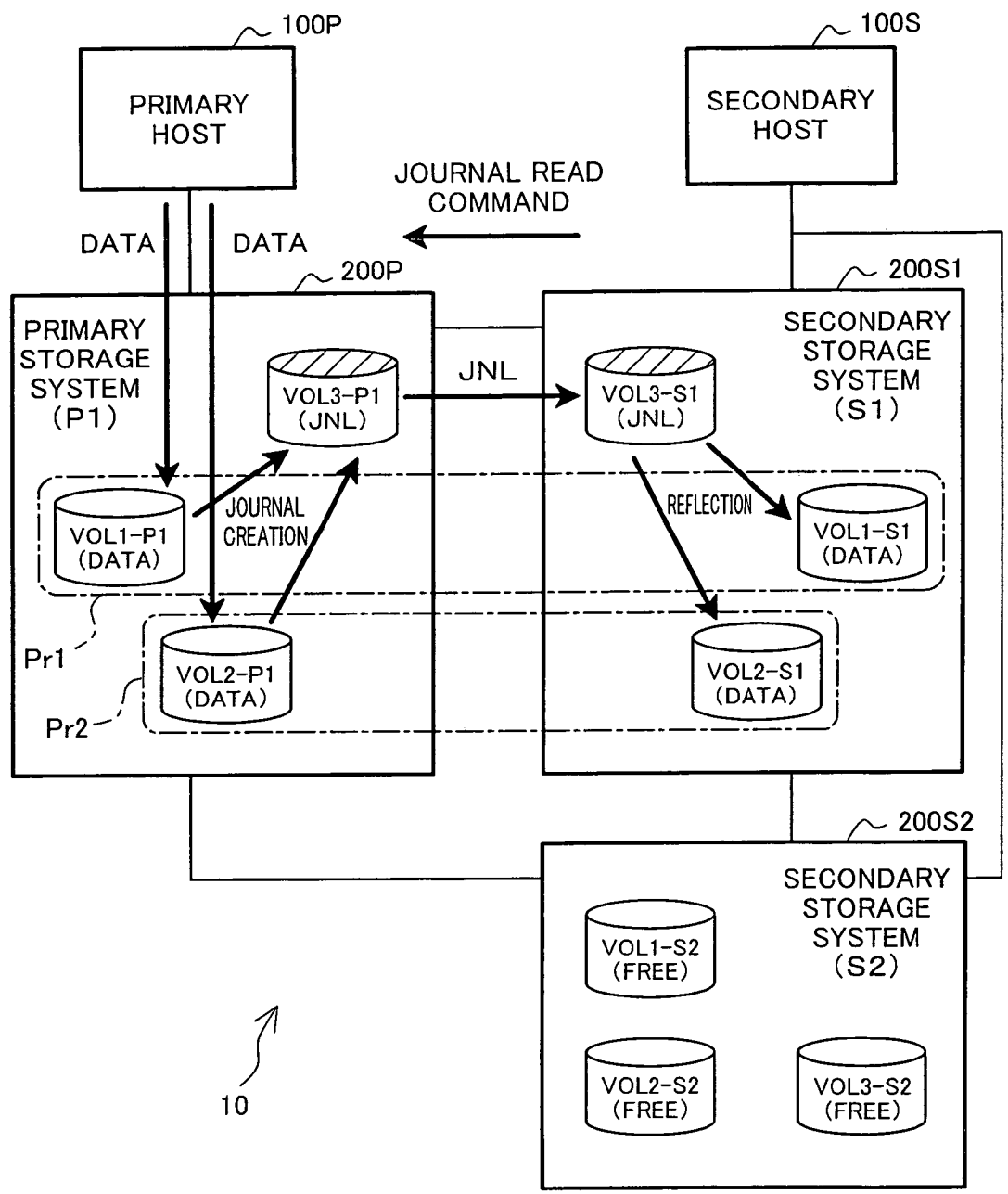
FIG. 9 is a diagram showing in outline remote copying in the data processing system 10 of Embodiment 1.

FIG. 9 is a diagram showing in outline remote copying in the data processing system 10 of Embodiment 1. Remote copying is a process for storing in a volume 272S of the secondary storage system 200S copy of data stored in a volume 272P of the primary storage system 200P in accordance with an instruction from the host computer 100P.

In the following description, for example, the data volume whose volume identifier is "VOL1" belonging to the storage system 200 whose storage system identifier is "P1" will be designated as "data volume VOL1-P1." This convention will be used for other data volumes and journal volumes as well.

In the example of FIG. 9, the primary storage system 200P and the secondary storage system 200S1 each have two data volumes (VOL1 and VOL2). Also, in the example of FIG. 9, one copy pair (designated as "copy pair Pr1") is composed of data volume VOL1-P1 of the primary storage system 200P and data volume VOL1-S1 of the secondary storage system 200S1. Similarly, another copy pair (designated as "copy pair Pr2") is composed of data volume VOL2-P1 and data volume VOL2-S1 (see FIG. 3). In FIG. 9, the two copy pairs Pr1 and Pr2 are shown enclosed by dot-and-dash lines. As shown in FIG. 3, these two copy pairs belong to the same copy group GRP1.

Here, a copy group is a set of one or more copy pairs. Data storing in secondary volumes making up all of copy pairs belonging to one copy group is executed in sequence consistent with the sequence of data storing in primary volumes making up all of the copy pairs.

As noted, in each storage system 200, one or more journal volumes are prepared for each copy group. In the example of FIG. 9, journal volumes (VOL3-P1 and VOL3-S1) are prepared for the primary storage system 200P and the secondary storage system 200S1, respectively (see FIG. 6). In FIG. 9, in order to make it easy to distinguish the journal volumes, portions of the journal volumes are shown with hatching.

When a Data Write command is issued from the primary host computer 100P to the primary storage system 200P, the copy process program 235P (FIG. 4) of the primary storage system 200P temporarily stores the Write command in the cache memory 240P (FIG. 1), and then stores the data included in the Write command in the specified data volume.

Where writing of data is performed to a data volume (primary volume) making up a copy pair, the copy process program 235P creates a journal corresponding to the Write operation, and stores it in the journal volume corresponding to the coup group to which the copy pair belongs.

Figures 10, 11:
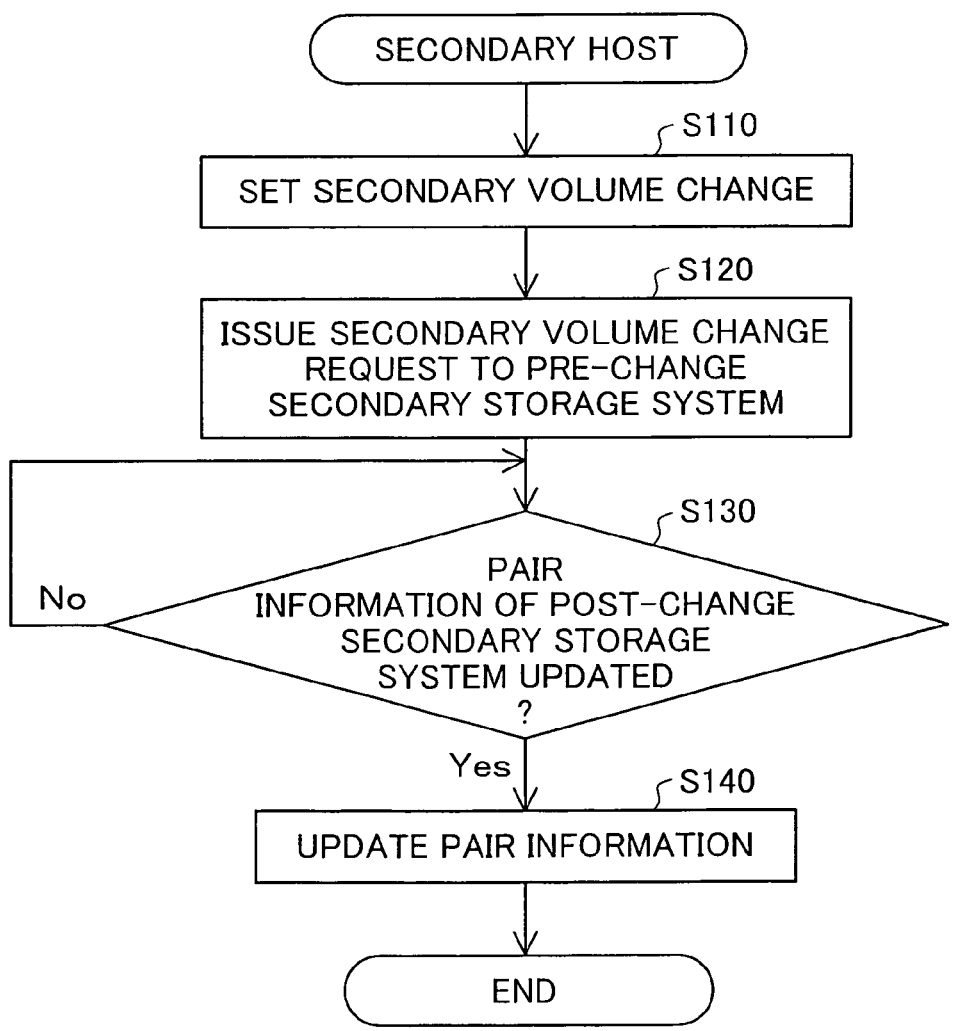
FIG. 10 is a diagram showing an example of contents of write information 280 included in a journal.
FIG. 11 is a flowchart showing the flow of the secondary volume change process in Embodiment 1.

Here, a journal is information representing a record of Data Write operations to the primary volume, and is created each time that the primary volume is written to. The journal includes write data which is a copy of data stored in the primary volume, and write information 280. FIG. 10 is a diagram showing an example of contents of write information 280 included in a journal. The write information 280 includes the time of receipt of the Write command by the primary storage system 200P, a group identifier identifying the copy group, a sequence number, a primary volume identifier indicating the primary volume written to, and write data size. The sequence number is a number indicating the write sequence corresponding to the journal, among Write operations to the primary volume making up all copy pairs belonging to one copy group.

The copy process program 235S (FIG. 7) of the secondary storage system 200S1 (FIG. 9) having the secondary volume, at arbitrary timing, issues a Journal Read command to the primary storage system 200P, requesting transmission of the journal. This Journal Read command includes a storage system identifier identifying the secondary storage system 200S that issued the command, and a group identifier identifying the copy group. The Journal Read command may also include the largest received sequence number. Here, largest received sequence number refers to the largest number among journal sequence numbers already received.

The copy process program 235P (FIG. 4) of the primary storage system 200P (FIG. 9) that has received the Journal Read command identifies the journal volume corresponding to the Journal Read command, on the basis of group identifier included in the Journal Read command and group information 233P (FIG. 6) associating the copy group with the journal volume. The copy process program 235P, on the basis of storage system identifier included in the Journal Read command and pair information (FIG. 3) defining the copy pair, also identifies the primary volume making up the copy pair with the secondary volume of the secondary storage system 200S that is the issuing source of the Journal Read command. Then, referring to the write information 280 (FIG. 10), the journal corresponding to the identified primary volume is selected from among the journals stored in the journal volume, and transmitted to the secondary storage system 200S1. When the Journal Read command includes the largest received sequence number, the copy process program 235P may delete journals having sequence numbers smaller than the largest received sequence number, from among the journals stored in the journal volume.

The copy process program 235S (FIG. 7) of the secondary storage system 200S1 (FIG. 9) receives the journal transmitted from the primary storage system 200P, and stores it in the journal volume. Then, at arbitrary timing, the copy process program 235S stores the write data contained in the journal, in the data volume. Within a given group, this Data Write operation is executed in order of sequence number of the write information 280 contained in the journal. Storing write data contained in the journal in the data volume may be termed "reflection of the journal."

By means of the process described above, remote copying is executed, and data identical to data stored in the primary volume of the primary storage system 200P is stored in the secondary volume, in a sequence matching the storage sequence in the primary volume.

A-3. Secondary Volume Change Process

Figure 12:
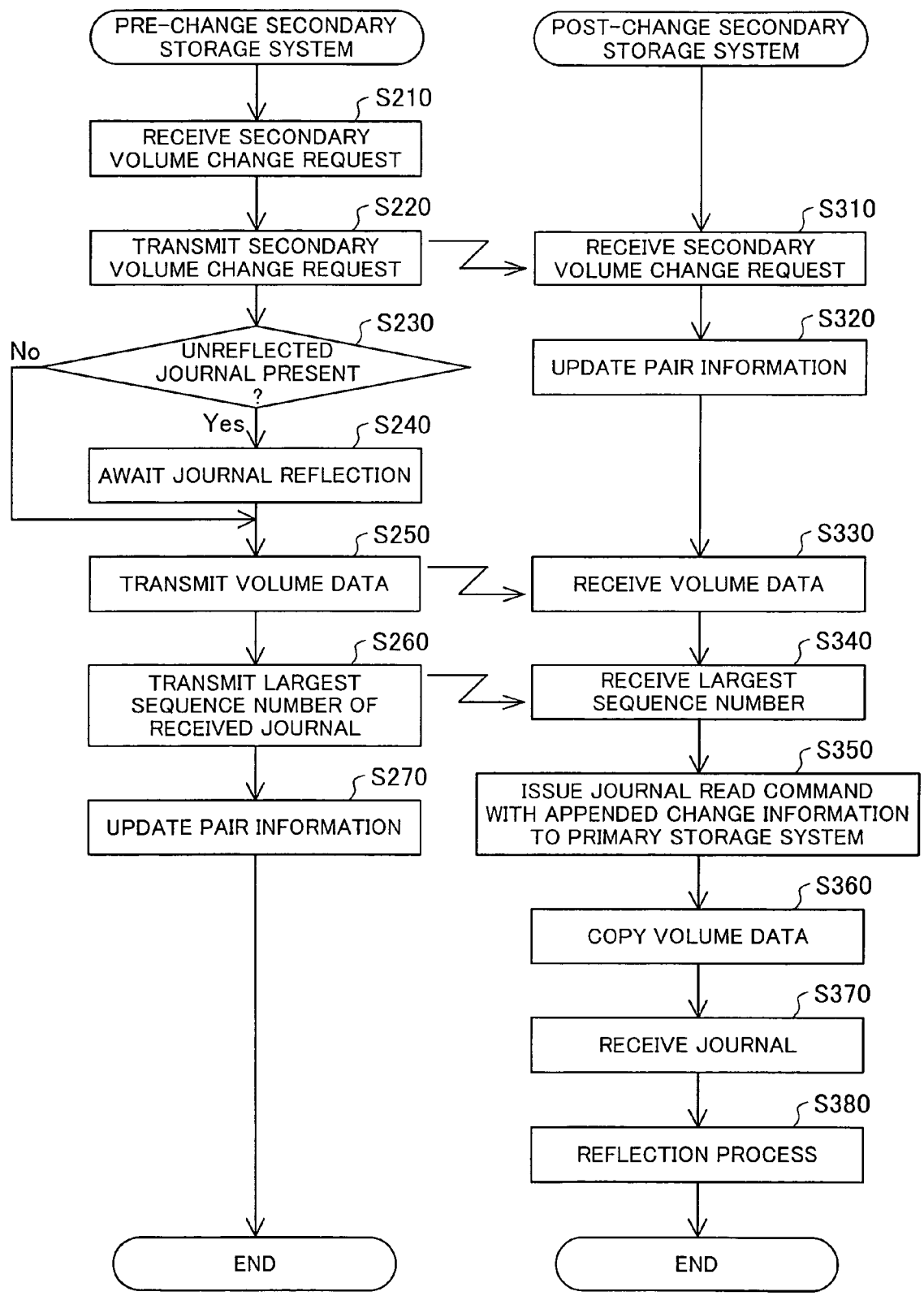
FIG. 12 is a flowchart showing the flow of the secondary volume change process in Embodiment 1.
Figure 13:
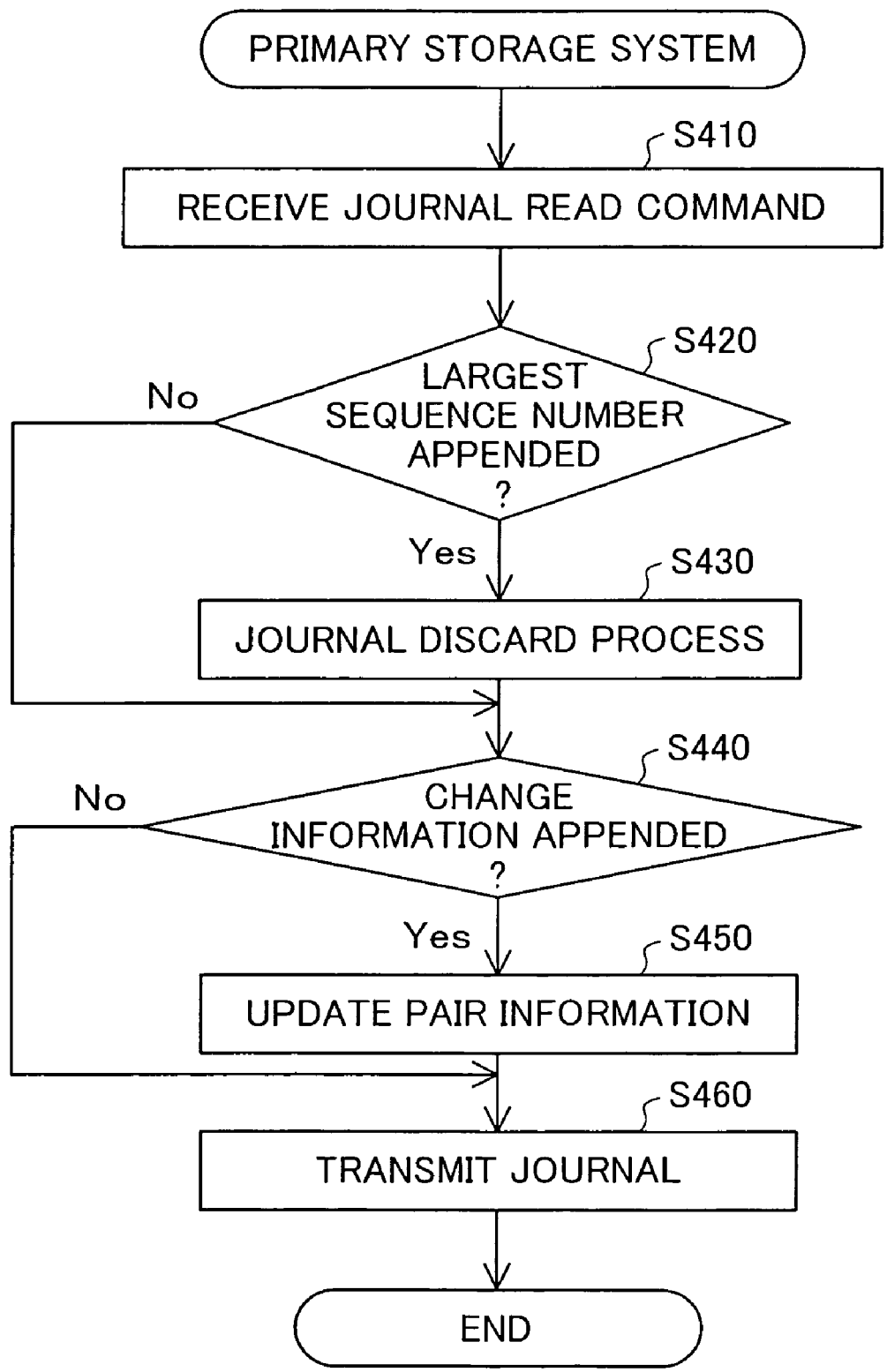
FIG. 13 is a flowchart showing the flow of the secondary volume change process in Embodiment 1.
Figure 14:
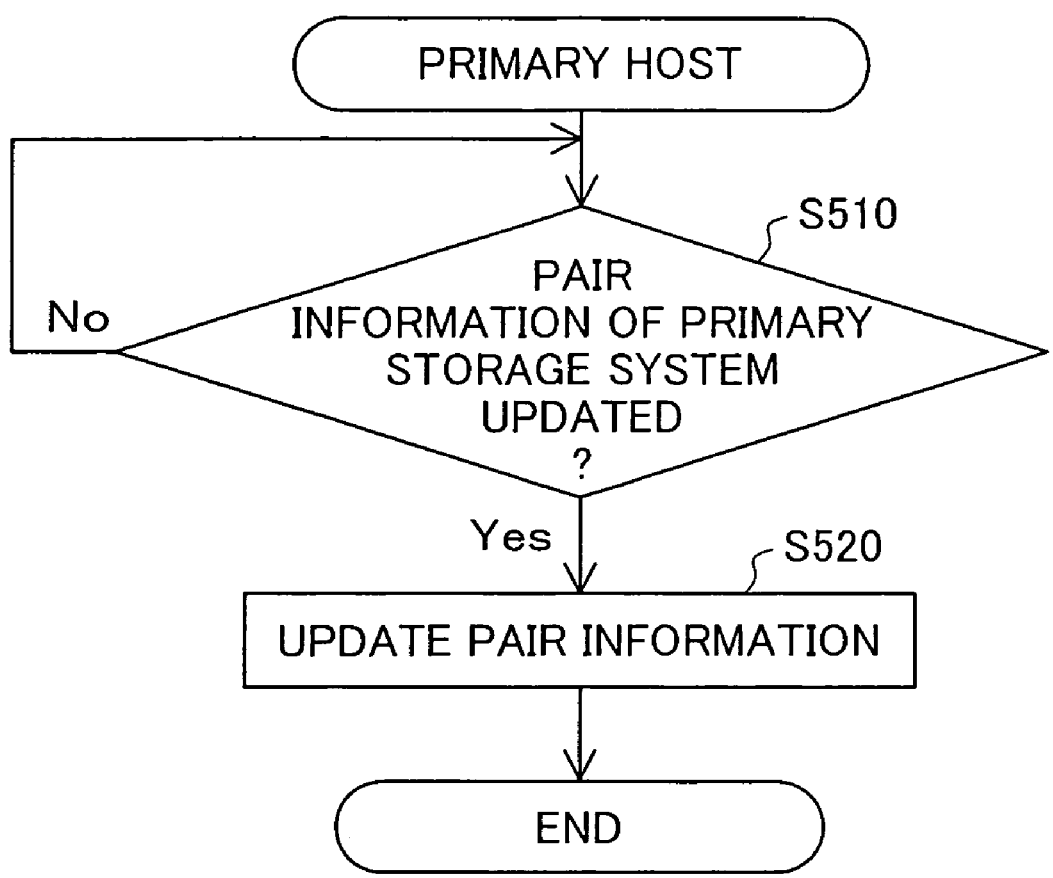
FIG. 14 is a flowchart showing the flow of the secondary volume change process in Embodiment 1.
Figure 15:
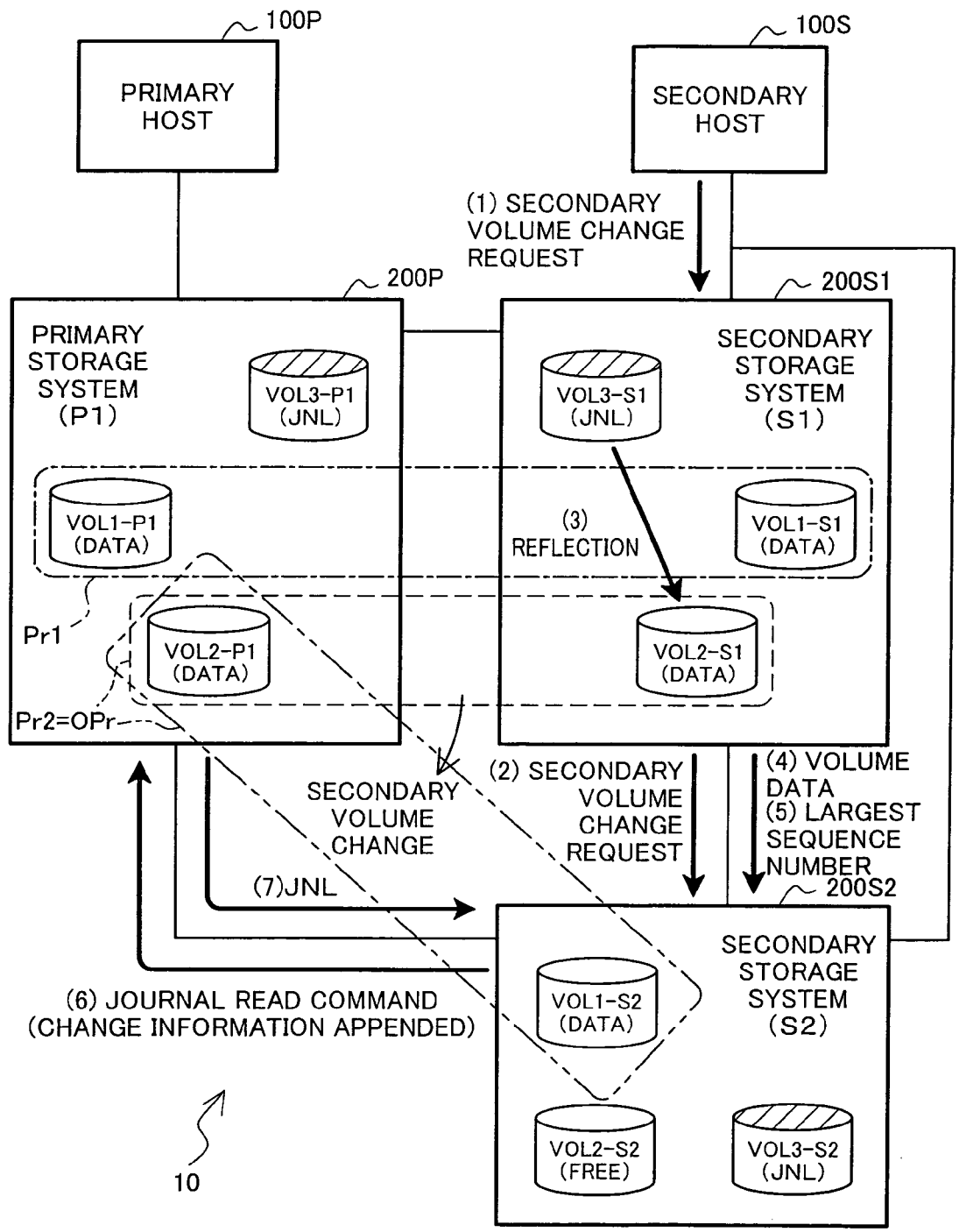
FIG. 15 is a diagram showing the outline of the secondary volume change process.

FIGS. 11-14 are flowcharts showing the flow of the secondary volume change process in Embodiment 1. FIG. 11 shows the process of the secondary host 100S in the secondary volume change process. Similarly, FIG. 12 shows the process of the secondary storage system 200S, FIG. 13 shows the process of the primary storage system 200P, and FIG. 14 shows the process of the primary host 100P. FIG. 15 is a diagram showing the outline of the secondary volume change process.

The secondary volume change process is a process for changing the secondary volume in one copy pair (termed "target copy pair OPr") within the data processing system 10 to another volume 272. In the example of FIG. 15, a copy pair Pr2 composed of data volume VOL2-P1 of the primary storage system 200P and the data volume VOL2-S1 of the secondary storage system 200S1 is set as the target copy pair OPr. By means of the secondary volume change process, the secondary volume (VOL2-S1) of the target copy pair OPr is changed to data volume VOL1-S2 of the secondary storage system 200S2. In FIG. 15, the pre-change target copy pair OPr is shown enclosed by broken lines, and the post-change target copy pair OPr is shown enclosed by double-dot and dash lines.

In Step S110 (FIG. 11), the storage system management program 122 (FIG. 2) of the secondary host 100S sets change of the secondary volume. Specifically, in accordance with a user instruction, the storage system management program 122 sets the target copy pair OPr and the change destination of the secondary volume in the target copy pair OPr (termed the "post-change secondary volume"), and creates change information 234S (FIG. 8). The post-change secondary volume is selected from among free volumes whose attribute is set to "free" in the volume information 232 (FIG. 5) belonging to the secondary storage system 200S.

In Step S120 (FIG. 11), the change request issuing module 123 (FIG. 2) of the secondary host 100S issues a secondary volume change request that includes change information 234S (see (1) in FIG. 15). The secondary volume change request is issued to the storage system (termed "pre-change secondary storage system 200S") that has the pre-change secondary volume (termed the "pre-change secondary volume") in the target copy pair OPr. In the example of FIG. 15, the secondary volume change request is issued to secondary storage system 200S1, which is the pre-change secondary storage system 200S.

In Step S130 (FIG. 11), the storage system management program 122 (FIG. 2) of the secondary host 100S monitors updating of the pair information 231S belonging to the storage system (termed the "post-change secondary storage system 200S") that has the post-change secondary volume. Once it is verified that the pair information 231S (FIG. 7) belonging to the post-change secondary storage system 200S has been updated, the process advances to Step S140, whereupon the storage system management program 122 updates the pair information 121 (FIG. 2) belonging to the secondary host 100S, on the basis of the change information 234S.

Next, the process of the secondary storage system 200S in the secondary volume change process will be described with reference to FIG. 12. The process of the pre-change secondary storage system 200S is shown at left in FIG. 12, and the process of the post-change secondary storage system 200S is shown at right in FIG. 12. In the example of FIG. 15, the pre-change secondary storage system 200S is the secondary storage system 200S1, and the post-change secondary storage system 200S is the secondary storage system 200S2.

In Step S210 (FIG. 12), the secondary volume change process module 237S (FIG. 7) of the pre-change secondary storage system 200S1 receives the secondary volume change request issued by the secondary host 100S (see Step S120 of FIG. 11). At this time, the change information 234S included in the received secondary volume change request is stored in the memory 230S1 of the secondary storage system 200S1 (see FIG. 7). As noted, the copy process program 235S (see FIG. 7) of the secondary storage system 200S1 carries out processes relating to remote copying, such as issuing of Journal Read commands; after receiving a secondary volume change request, however, it suspends issuing of Journal Read commands to the copy group to which belongs the copy pair that includes the pre-change secondary volume.

In Step S220, the secondary volume change process module 237S transmits the received secondary volume change request to the secondary storage system 200S2 which is the post-change secondary storage system 200S (see (2) in FIG. 15).

In Step S230, the secondary volume change process module 237S determines whether any unreflected journals for the pre-change secondary volume (in the example of FIG. 15, VOL2-S1) remain in the journal volume. In the event of a determination that an unreflected journal remains, the routine advances to Step S240 wherein the secondary volume change process module 237S waits until the unreflected journal is reflected (see (3) in FIG. 15). On the other hand, in the event of a determination that no unreflected journal remains, the routine advances to Step S250.

In Step S250, the secondary volume change process module 237S transmits a copy of the pre-change secondary volume data to the post-change secondary storage system 200S (see (4) in FIG. 15). In Step S260, the secondary volume change process module 237S transmits to the post-change secondary storage system 200S the largest sequence number of the journals already received (see (5) in FIG. 15). The largest sequence number of journals already received is the largest number among sequence numbers of journals corresponding to the copy group to which belongs the copy pair that includes the pre-change volume, received by the secondary storage system 200S1 (see FIG. 10).

In Step S270, the secondary volume change process module 237S updates the pair information 231S (FIG. 7) belonging to the secondary storage system 200S, on the basis of the update information 234S.

In Step S310, the secondary volume change process module 237S (FIG. 7) of the post-change secondary storage system 200S2 receives the secondary volume change request transmitted by the pre-change secondary storage system 200S1. At this time, the change information 234S contained in the secondary volume change request is stored in the memory 230S2 of the secondary storage system 200S2.

In Step S320, the secondary volume change process module 237S updates the pair information 231S (FIG. 7) belonging to the secondary storage system 200S2, on the basis of the change information 234S. At this time, in the event that part of a copy pair belonging to a new copy group happens to exist in the secondary storage system 200S2 in association with updating of the change information 234S, the secondary volume change process module 237S sets a journal volume for use for the copy group and updates the volume information 232 (FIG. 7) and the group information 233. Setting of a journal volume is carried out on the basis of user instruction. In the example of FIG. 15, journal volume VOL3-S2 is prepared.

In Step S330, the secondary volume change process module 237S receives the data transmitted by the pre-change secondary storage system 200S1 as data stored in the pre-change secondary volume (see Step S250). In Step S340, the secondary volume change process module 237S receives the largest sequence number transmitted by the pre-change secondary storage system 200S1 (see Step S260). The received pre-change secondary volume data and the largest sequence number are stored temporarily in the cache memory 240S2 (FIG. 1).

In Step S350, the copy process program 235S (FIG. 7) of the secondary storage system 200S2 issues a Journal Read command to the primary storage system 200P having the primary volume in the target copy pair OPr (see (6) in FIG. 15). At this time, the change information 234S and the largest sequence number are appended to the Journal Read command.

In Step S360, the secondary volume change process module 237S of the secondary storage system 200S2 stores the pre-change secondary volume data in the post-change secondary volume. By so doing, initial copying between the pre-change secondary volume and the post-change secondary volume is completed.

In Step S370, the copy process program 235S of the secondary storage system 200S2 receives the journal transmitted to it by the primary storage system 200P in response to the Journal Read command issued in Step S350 (see (7) in FIG. 15). In Step S380, the copy process program 235S carries out the journal reflection process. The process beginning with Step S370 is the ordinary remote copy process.

Next, the process of the primary storage system 200P in the secondary volume change process will be described with reference to FIG. 13. In Step S410, the copy process program 235P (FIG. 4) of the primary storage system 200P receives a Journal Read command from the secondary storage system 200S.

In Step S420, the copy process program 235P determines whether a largest sequence number has been appended to the Journal Read command. In the event of a determination that a largest sequence number has been appended, the process advances to Step S430, whereupon the copy process program 235P deletes from the journal volume those journals having sequence numbers smaller than the largest sequence number. In the event of a determination that a largest sequence number has not been appended, the process advances to Step S440.

In Step S440, the copy process program 235P determines whether change information 234 has been appended to the Journal Read command. In the event of a determination that change information 234 has been appended, the process advances to Step S450, whereupon the pair information update module 236P (FIG. 4), on the basis of the change information 234, updates the pair information 231P (FIG. 4) belonging to the primary storage system 200P. By so doing, the destination of the journal corresponding to the target copy pair OPr is changed to the secondary storage system 200S2 which is the post-change secondary storage system.

In the event of a determination that change information 234 has not been appended, the process advances to Step S460. In Step S460, the copy process program 235P, on the basis of the pair information 231P, transmits the journal to the secondary storage system 200S.

Next, the process of the primary host 100P in the secondary volume change process will be described with reference to FIG. 14. In Step S510, the storage system management program 122 (FIG. 2) of the primary host 100P monitors updating of the pair information 231P (FIG. 4) belonging to the primary storage system 200P. In the event that updating of the pair information 231P is detected, the storage system management program 122 updates the pair information 121 (FIG. 2) belonging to the primary host 100P, so that it matches the pair information 231P belonging to the primary storage system 200P (Step S520).

As described hereinabove, in the secondary volume change process carried out in the data processing system 10 of this embodiment, once the pre-change secondary storage system 200S1 receives a secondary volume change request, issuance of Journal Read commands requesting the journal corresponding to the pre-change volume is suspended. Thus, subsequently, the journal corresponding to the pre-change volume will not be transmitted to the pre-change secondary storage system 200S1. The secondary volume change request is transferred from the pre-change secondary storage system 200S1 to the post-change secondary storage system 200S2. After that, initial copying from the pre-change volume to the post-change volume is executed, and a Journal Read command having change information 234 appended thereto is issued by the post-change secondary storage system 200S2 to the primary storage system 200P. The primary storage system 200P then updates the pair information 121 on the basis of the change information 234, and in accordance with the updated pair information 121 the journal is transmitted to the post-change secondary storage system 200S2. In this way, in the secondary volume change process carried out in the data processing system 10 of this embodiment, the secondary volume making up a copy pair can be changed to another volume 272, without suspending access to the volumes 272 of the storage systems 200.

Additionally, in the secondary volume change process carried out in the data processing system 10 of this embodiment, the post-change secondary storage system 200S2 can issue a Journal Read command to the primary storage system 200P, independently of initial copying to the post-change secondary volume (Step S360 of FIG. 12). Thus, the primary storage system 200P can transfer the journal to the post-change secondary storage system 200S2, without waiting for initial copying to finish in the post-change secondary storage system 200S2.

Additionally, in the secondary volume change process carried out in the data processing system 10 of this embodiment, since the secondary volume of the target copy pair OPr can be changed to a volume 272 contained in a different secondary storage system 200S, change of the secondary volume can be carried out in association with an expansion of storage systems 200, or for the purpose of distributing the load on the pre-change secondary storage system 200S1.

Additionally, in the secondary volume change process carried out in the data processing system 10 of this embodiment, by means of appending change information 234 to Journal Read commands issued by the post-change secondary storage system 200S2, change information 234 can be transferred to the primary storage system 200P. Thus, change information 234 can be sent to the primary storage system 200P through a process that is executed in the ordinary remote copy process.

Additionally, in the secondary volume change process carried out in the data processing system 10 of this embodiment, the secondary volume change request is issued by the secondary host 100S to the pre-change secondary storage system 200S1, and transferred from the pre-change secondary storage system 200S1 to the post-change secondary storage system 200S2. The pre-change secondary storage system 200S1, upon receiving the secondary volume change request, then suspends issuance of Journal Read commands. Thus, it is possible to avoid a situation wherein an additional Journal Read command is issued by the pre-change secondary storage system 200S1, once the post-change secondary storage system 200S2 has issued a Journal Read command to the primary storage system 200P. Accordingly, the secondary volume change process in remote copying can be carried out smoothly.

Additionally, in the data processing system 10 of this embodiment, copy groups are set with a view to greater efficiency in remote copying. In this way, in the secondary volume change process of the data processing system 10 of this embodiment, a secondary volume making up a copy pair can be changed to another volume 272, even in instances where a copy group has been set.

B. Embodiment 2

Figure 16:
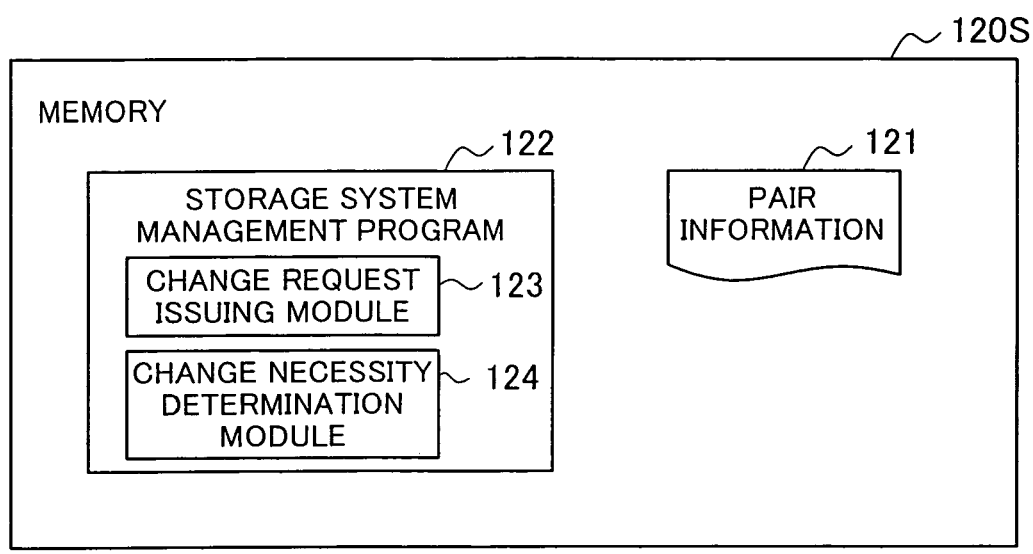
FIG. 16 is a diagram showing an internal arrangement of the memory 120S of the secondary host computer 100S in the data processing system 10 in Embodiment 2.

FIG. 16 is a diagram showing an internal arrangement of the memory 120S (FIG. 1) of the secondary host computer 100S in the data processing system 10 in Embodiment 2. A difference from Embodiment 1 shown in FIG. 2 is that the storage system management program 122 stored in the memory 120S of the secondary host computer 100S includes function as a change necessity determination module 124.

Figure 17:
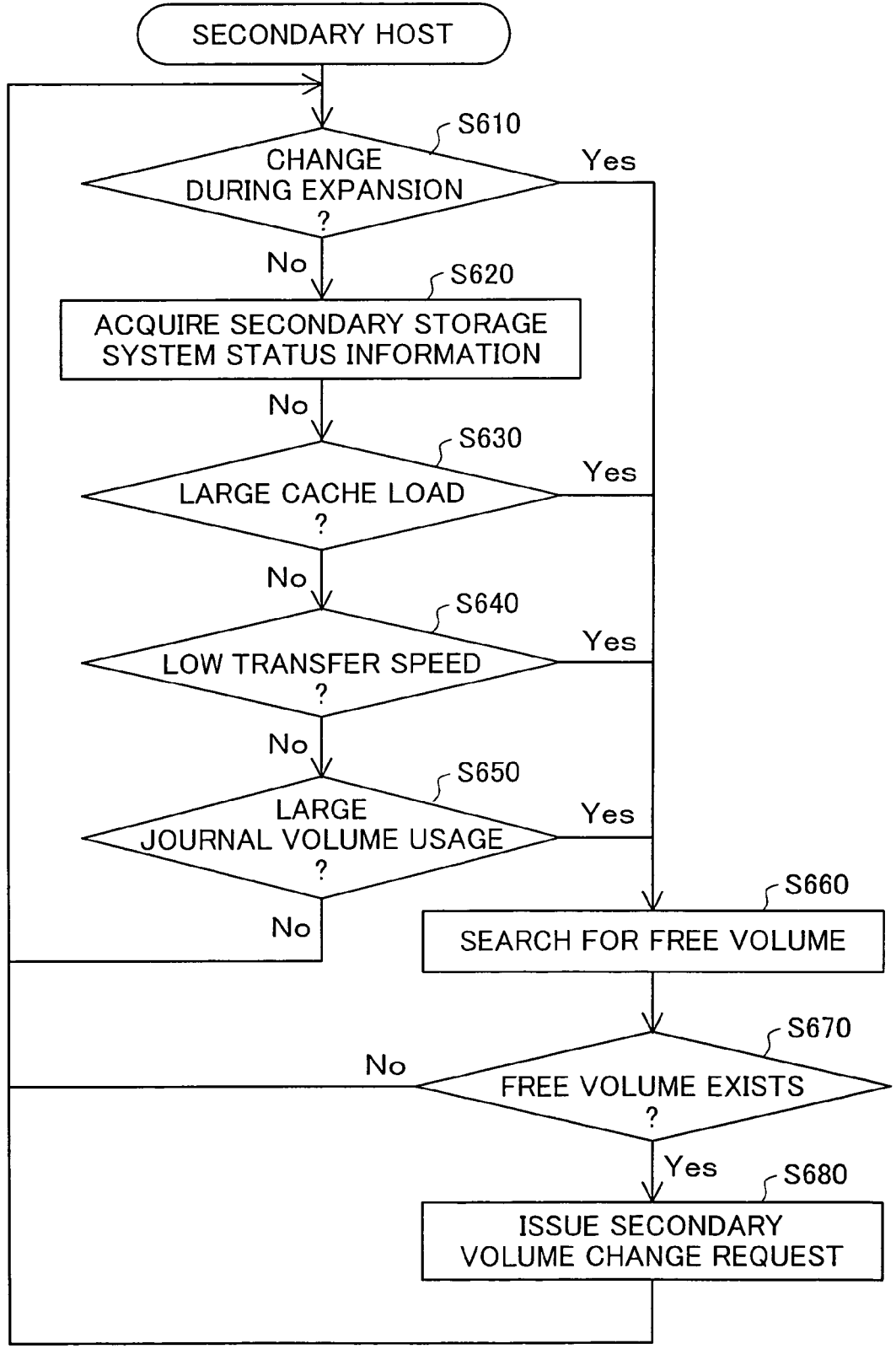
FIG. 17 is a flowchart showing the flow of the process of the secondary host 100S in the secondary volume change process in Embodiment 2.

FIG. 17 is a flowchart showing the flow of the process of the secondary host 100S in the secondary volume change process in Embodiment 2. A difference from Embodiment 1 shown in FIG. 11 is that in Embodiment 2, the secondary host 100S determines the necessity of issuing a secondary volume change request, and in the event of a determination that it is necessary to issue one, issues a secondary volume change request.

In Step S610 (FIG. 17), the change necessity determination module 124 (FIG. 16) of the secondary host 100S determines whether the secondary storage system 200S has been expanded and secondary volume change has been requested. In the event this condition is met, the process advances to Step S660. In the event the condition is not met, process advances to Step S620.

In Step S620, the storage system management program 122 (FIG. 16) acquires status information of the secondary storage system 200S (FIG. 1). In this embodiment, status information of the secondary storage system 200S includes at a minimum the load on the cache memory 240S (FIG. 1) of the secondary storage system 20S, transfer speed on the path between the secondary storage system 200S and the primary storage system 200P, and journal volume usage.

In Step S630, the change necessity determination module 124 determines whether load of the cache memory 240S included in the status information is higher than a predetermined threshold value. In the event of a determination that the load is high, the process advances to Step S660.

On the other hand, in the event of a determination that the load is not high, the process advances to Step S640, whereupon the change necessity determination module 124 determines whether the transfer speed included in the status information is below a predetermined threshold value. In the event of a determination that transfer speed is low, the process advances to Step S660.

On the other hand, in the event of a determination that transfer speed is not low, the process advances to Step S650, whereupon the change necessity determination module 124 determines whether the journal volume usage included in the status information is greater than a predetermined threshold value. In the event of a determination that journal volume usage is high, the process advances to Step S660. In the event of a determination that journal volume usage is not high, the routine returns to Step S610, and the above process repeats.

In Step S660, the storage system management program 122 refers to the volume information 232 (FIG. 5) and searches for a free volume among the volumes 272 within the secondary storage system 200S.

In the event that a free volume is found (Step S670: Yes), the process advances to Step S680, and the change request issuing module 123 (FIG. 16) issues a secondary volume change request. The subsequent process is similar to that of Embodiment 1 shown in FIG. 11. If, on the other hand, no free volume is found (Step S670: No), the routine returns to Step S610, and the above process repeats.

An arrangement wherein, in Step S670, in the event that a free volume is found, the change necessity determination module 124 displays the found free volume on the display device 140S (FIG. 1), receives from the user secondary volume change request issue permission and specification of a post-change secondary volume, and then issues a secondary volume change request in Step S680 would also be acceptable.

As described above, in the data processing system 10 in Embodiment 2, the secondary host 100S determines the necessity of issuing a secondary volume change request, and in the event of a determination that issuance is necessary, issues a secondary volume change request. Thus, change of a secondary volume in association with expansion of storage systems or change of a secondary volume in order to distribute the load of a secondary storage system 200S can be carried out automatically.

C. Embodiment 3

Figure 18:
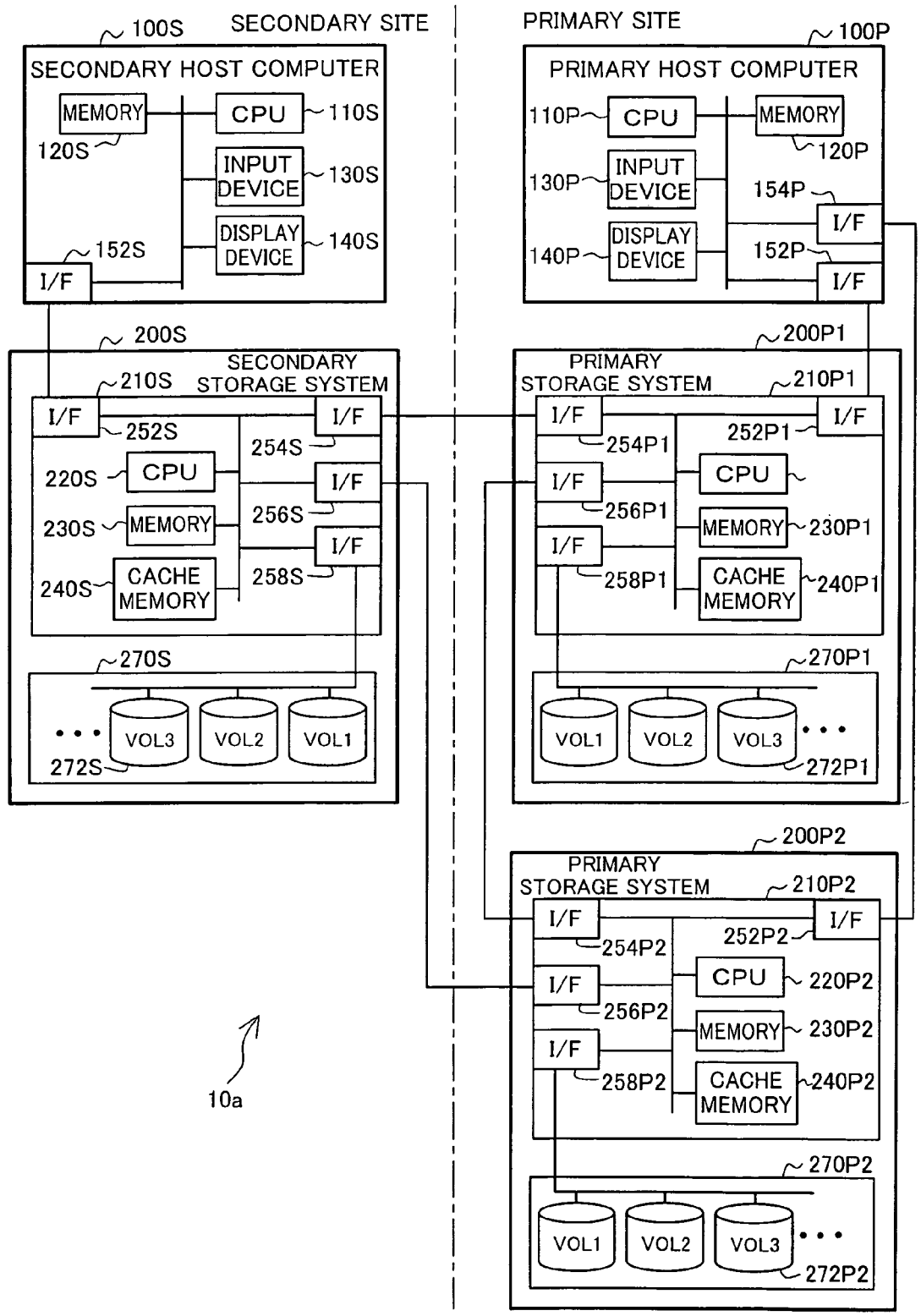
FIG. 18 is a diagram showing an arrangement of a data processing system 10a in Embodiment 3.

FIG. 18 is a diagram showing an arrangement of a data processing system 10a in Embodiment 3. A difference from Embodiment 1 shown in FIG. 1 is in the number of storage systems 200 provided in the data processing system 10a. Specifically, in the data processing system 10a in Embodiment 3, two primary storage systems 200P (200P1, 200P2) and one secondary storage system 200S are provided.

Figure 19:
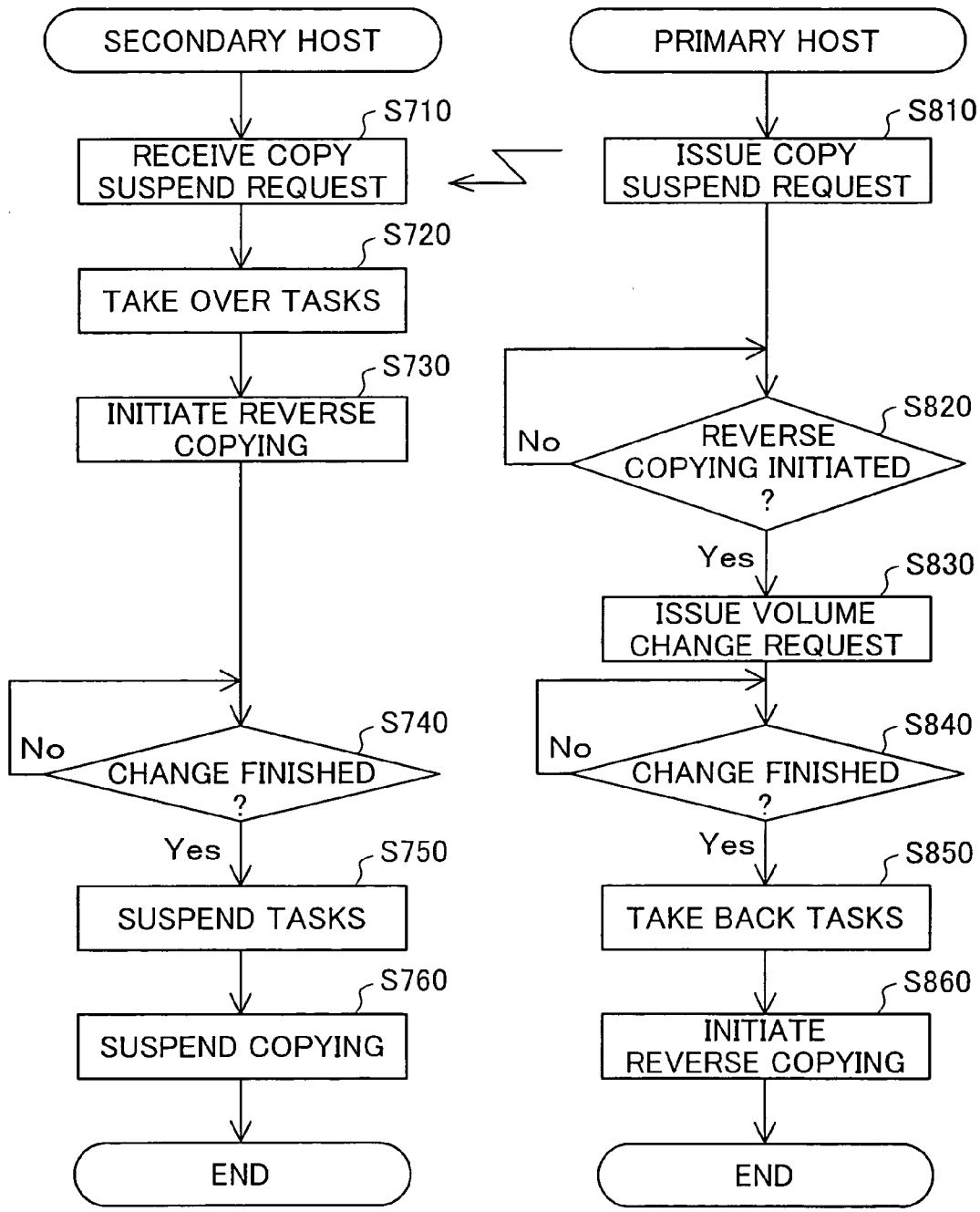
FIG. 19 is a flowchart showing the flow of processing by the host computer 100 in the volume change process in Embodiment 3.
Figure 20:
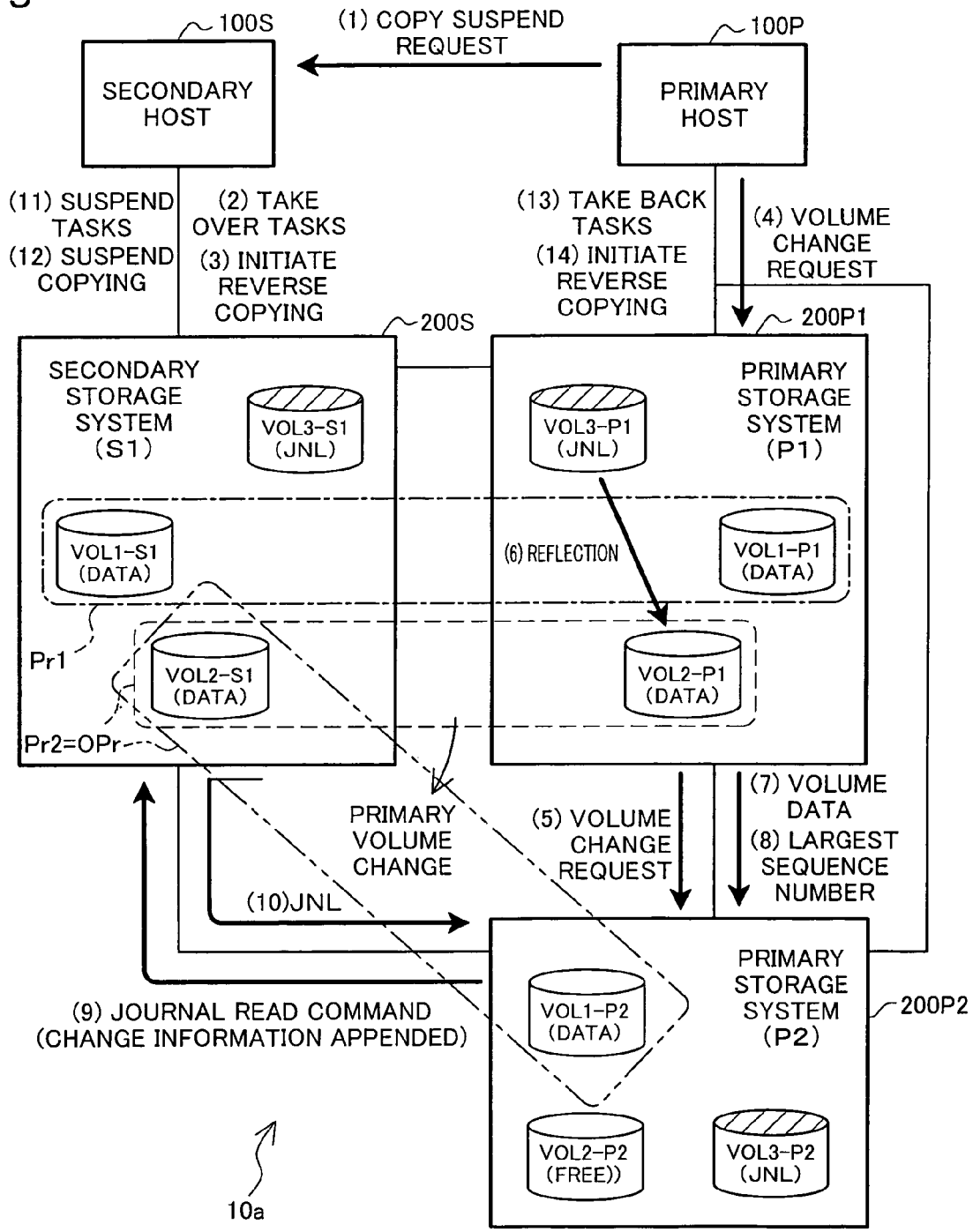
FIG. 20 is a diagram showing an outline of the volume change process in Embodiment 3.

In Embodiment 3, a volume change process to change the primary volume making up a target copy pair OPr to another volume 272 is performed in the data processing system 10a. FIG. 19 is a flowchart showing the flow of processing by the host computer 100 in the volume change process in Embodiment 3. The process of the secondary host 100S is shown at left in FIG. 19, and the process of the primary host 100P is shown at right. FIG. 20 is a diagram showing an outline of the volume change process in Embodiment 3.

In Step S810, the storage system management program 122 (FIG. 2) of the primary host 100P issues a copy suspension request (see (1) in FIG. 20). The copy suspension request is a command requesting suspension of copying in a copy pair in the data processing system 10a. In Step S820, the storage system management program 122 of the primary host 100P monitors whether reverse copying has been initiated in the copy pair in the data processing system 10a, while waiting until initiation.

In Step S710, the storage system management program 122 (FIG. 2) of the secondary host 100S receives the copy suspension request issued by the primary host 100P. In Step S720, the storage system management program 122 of the secondary host 100S takes over the tasks that were being executed by the primary host 100P (see (2) in FIG. 20). In Step S730, the storage system management program 122 of the secondary host 100S initiates reverse copying in the copy pair in the data processing system 10a (see (3) in FIG. 20). At this point in time, the primary site and the secondary site have switched positions, and the data processing system 10a has the same status as the data processing system 10 in Embodiment 1 shown in FIG. 1.

In Step S830, the change request issuing module 123 (FIG. 2) of the host 100P functioning as the secondary host at that point in time issues a volume change request (see (4) in FIG. 20). Subsequently, by means of a process similar to that of Embodiment 1, a volume change process is carried out in the target copy pair OPr (see (5) through (10) in FIG. 20).

In Steps S740 and S840, the storage system management program 122 of the host 100S and the host 100P monitor whether the volume change process has finished, while waiting for it to finish. Once the volume change process is verified to have finished, the process advances to Step S750 and S850.

In Step S750, the storage system management program 122 of the host 100S functioning as the primary host at that point in time suspends the task that it previously took over from the host 100P (see (11) in FIG. 20). In Step S760, the storage system management program 122 of the host 100S suspends copying in the copy pair (see (12) in FIG. 20).

In Step S850, the storage system management program 122 of the host 100P takes back the task from the host 100S (see (13) in FIG. 20). In Step S860, the storage system management program 122 of the host 100P initiates reverse copying in the copy pair (see (14) in FIG. 20).

As described above, in the data processing system 10a in Embodiment 3, the secondary host 100S temporarily takes over data processing tasks from the primary host 100P, and once the volume change process has been performed, the primary host 100P takes back data processing tasks from the secondary host 100S. In Embodiment 3, in this way, the primary volume making up the target copy pair OPr can be changed to another volume 272 without suspending access to volumes 272 within the storage systems 200.

D. Embodiment 4

Figure 21:
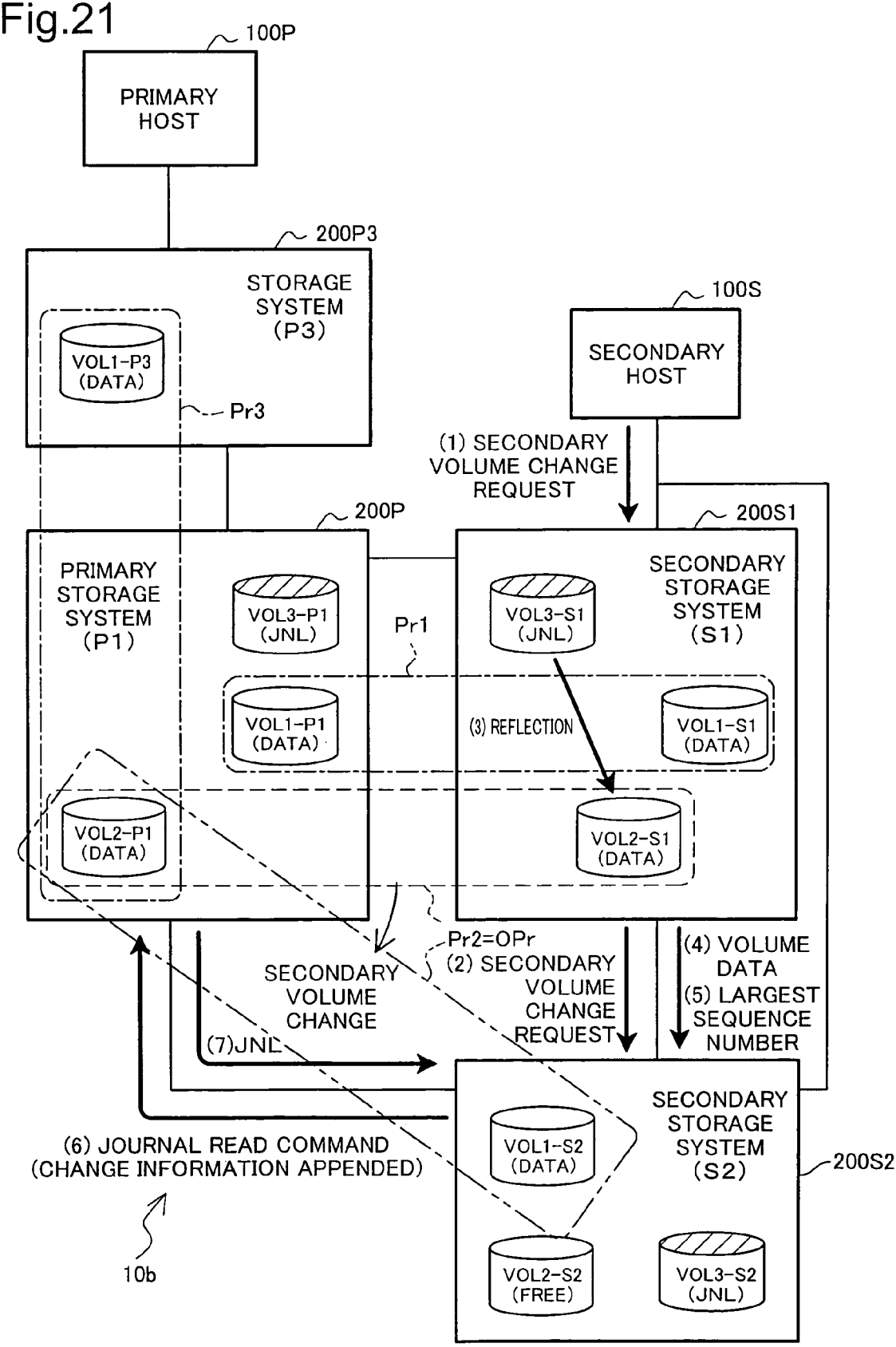
FIG. 21 is a diagram showing an outline of secondary volume change process in a data processing system 10b in Embodiment 4.

FIG. 21 is a diagram showing an outline of secondary volume change process in a data processing system 10b in Embodiment 4. A difference from Embodiment 1 shown in FIG. 15 is that in Embodiment 4, the primary storage system 200P is connected to the primary host 100P via a storage system 200P3. Storage system 200P3 is at the primary site, the primary storage system 200P is at an intermediate site, and the secondary storage systems (S1 and S2) are at remote sites.

In the data processing system 10b in Embodiment 4, a copy pair Pr3 is composed of data volume VOL1-P3 of the storage system 200P3 and data volume VOL2-P1 of the storage system 200P. When data is stored in data volume VOL1-P3 of the storage system 200P3 by the primary host 100P, a copy of the data is stored in data volume VOL2-P1 of the storage system 200P by means of remote copying in the copy pair Pr3. Additionally, by means of remote copying in copy pair Pr2, a copy of the data is stored in the data volume VOL2-S1 of the storage system 200S1.

As in Embodiment 1, in the volume change process in the data processing system 10b in Embodiment 4, copy pair Pr2 is set as the target copy pair OPr. The secondary volume in this target copy pair OPr is changed to data volume VOL1-S2 of the secondary storage system 200S2. The volume change process in Embodiment 4 is carried out in the same manner as the volume change process in Embodiment 1.

In the volume change process in the data processing system 10b in Embodiment 4, even in instances where the primary volume of the target copy pair OPr is the secondary volume of another copy pair, the secondary volume making up the target copy pair can be changed to another volume 272 without suspending access to volumes 272 within the storage systems 200.

E. Embodiment 5

Figure 22:
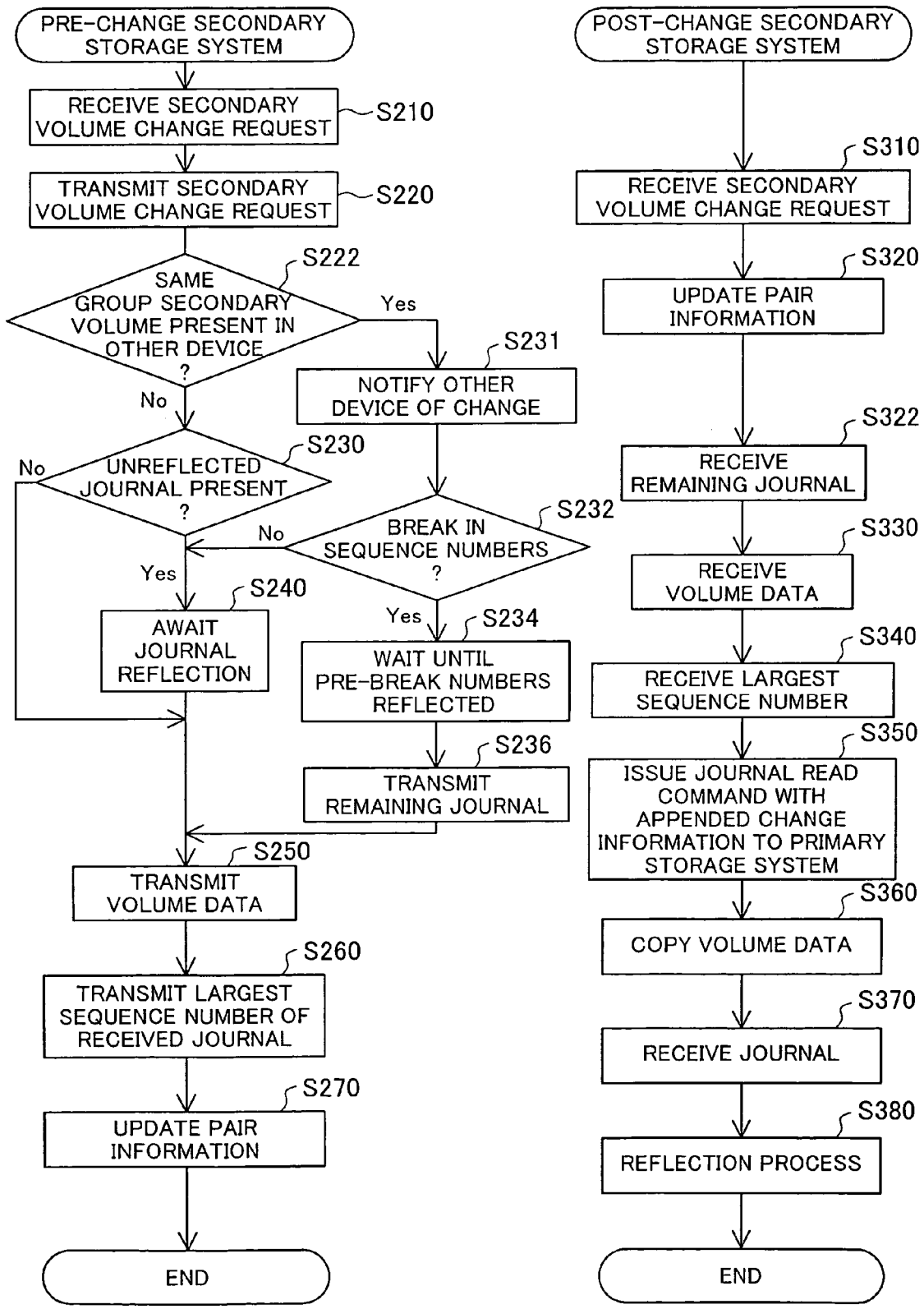
FIG. 22 is a flowchart showing the flow of the secondary volume change process in the data processing system 10c in Embodiment 5.
Figure 23:
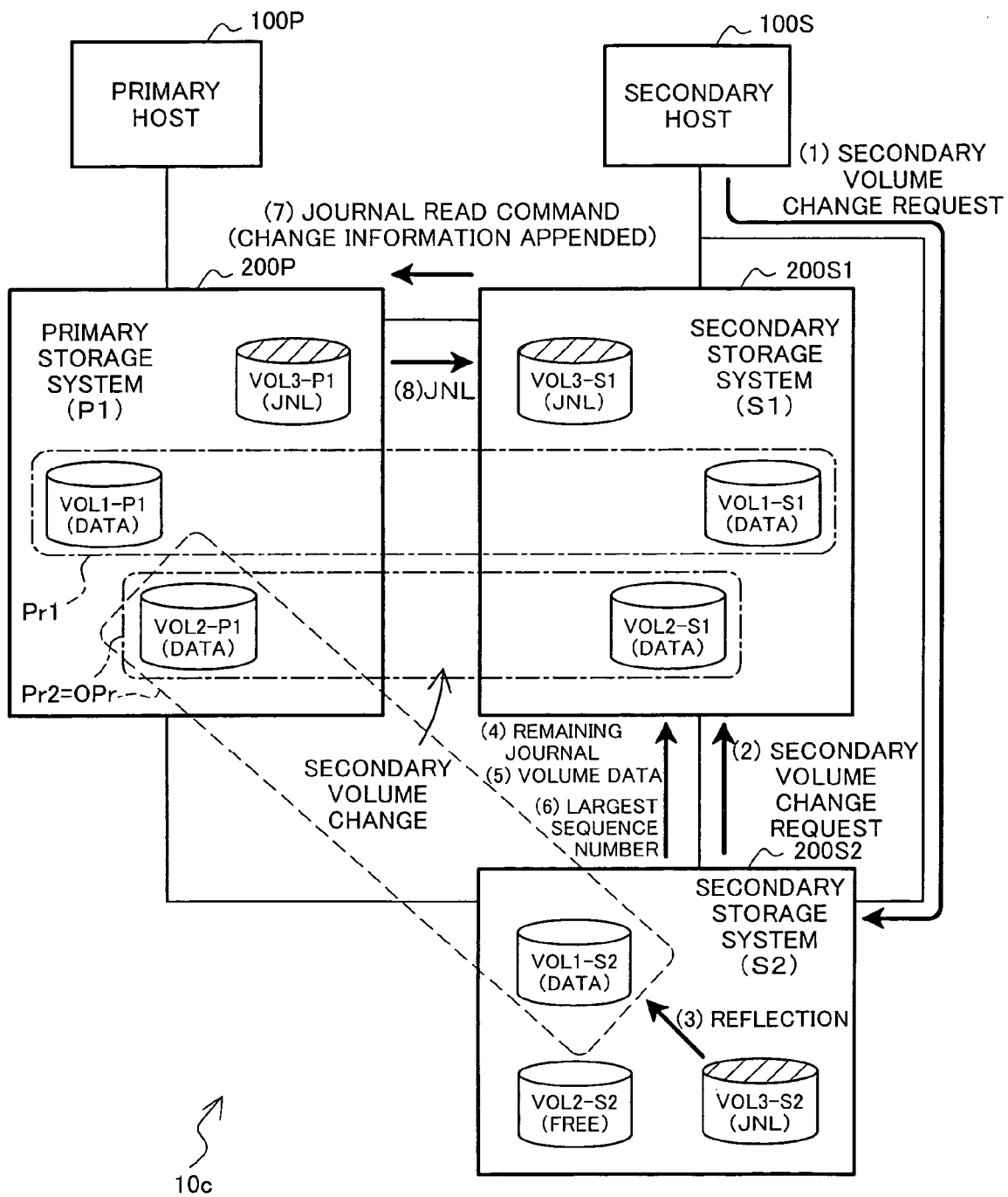
FIG. 23 is a diagram showing the outline of the secondary volume change process in the data processing system 10c in Embodiment 5.

FIG. 22 is a flowchart showing the flow of the secondary volume change process in the data processing system 10c in Embodiment 5. FIG. 22 shows the process of the secondary storage system 200S in the secondary volume change process. FIG. 23 is a diagram showing the outline of the secondary volume change process in the data processing system 10c in Embodiment 5.

As shown in FIG. 23, in the secondary volume change process in Embodiment 5, in the reverse of the secondary volume change process in Embodiment 1 shown in FIG. 15, the copy pair Pr2 composed of data volume VOL2-P1 of the primary storage system 200P and data volume VOL1-S2 of the secondary storage system 200S2 is set as the target copy pair OPr, and the secondary volume in the target copy pair OPr is changed to the data volume VOL2-S1 of the secondary storage system 200S1.

In the data processing system 10c in Embodiment 5, as in Embodiment 1, copy pair Pr1 is composed of data volume VOL1-P1 of the primary storage system 200P and data volume VOL1-S1 of the secondary storage system 200S1. Copy pair Pr1 and copy pair Pr2 (which is the target copy pair OPr) belong to the same copy group. Accordingly, the secondary volume change process in Embodiment 5 is a process for consolidating the secondary volumes of the two copy pairs belonging to the same copy group, in volumes 272 contained in the same secondary storage system 200S.

The process of Step S210 and Step S220 (FIG. 22) in the secondary volume change process in Embodiment 5 is the same as the process of Embodiment 1 shown in FIG. 12. However, the pre-change secondary storage system 200S (secondary storage system 200S2) and the post-change secondary storage system 200S (secondary storage system 200S1) are reversed (see (1) and (2) in FIG. 23).

In Step S222 (FIG. 22), the secondary volume change process module 237S (FIG. 7) of the pre-change secondary storage system 200S2 determines whether another secondary storage system 200S has a secondary volume of another copy pair belonging to the same copy group as the target copy pair OPr. The determination is made on the basis of pair information 231S (FIG. 7). In the event of a "No"

determination in Step S222, the process advances to Step S230, and the subsequent process is the same as in Embodiment 1. In the event of a "Yes" determination in Step S222, on the other hand, the process advances to Step S231.

In Step S231, the secondary volume change process module 237S of the pre-change secondary storage system 200S2 notifies the other secondary storage system 200S in Step S222 of the fact that the secondary storage system 200S having the secondary volume in the target copy pair OPr will be changed from the secondary storage system 200S2 to the secondary storage system 200S1. In Step S232, the secondary volume change process module 237S searches for a journal within the journal volume VOL3-S2 (FIG. 23) corresponding to the secondary volume of the target copy pair OPr, and determines whether there is a missing number (discontinuity) in the sequence numbers. If in Step S232 it is determined that there is no missing number, the process advances to Step S240, and the subsequent process is the same as the process in Embodiment 1. If on the other hand in Step S232 it is determined that there is a missing number, the process advances to Step S234.

In Step S234, the secondary volume change process module 237S waits for completion of reflection of journals with sequence numbers smaller than the missing number portion, going from the smallest number end (see (3) in FIG. 23). The journal of the missing number portion is the journal transmitted to the other secondary storage system 200S. Thus, in this Embodiment, in Step S234, only journals with sequence numbers smaller than the missing number portion are reflected; for the remaining journals, conformance to the journal reflection sequence in the copy group is preserved by means of performing reflection in the post-change secondary storage system.

In Step S236, the secondary volume change process module 237S transmits the remaining journals, i.e. journals with sequence numbers larger than the missing number portion, to the post-change secondary storage system 200S1 (see (4) in FIG. 23). The process beginning with Step S250 is the same as the process in Embodiment 1 (see (5) through (8) in FIG. 23).

The process of Steps S310 and S320 of the post-change secondary storage system 200S1 is the same as the process in Embodiment 1 shown in FIG. 12. In Step S322, the copy process program 235S (FIG. 7) of the post-change secondary storage system 200S1 receives the remaining journals transmitted by the pre-change secondary storage system 200S2. The process beginning with Step S330 is the same as the process in Embodiment 1. The process of reflecting the remaining journals received in Step S322 is carried out within the reflection process of Step S380. The process of reflecting the remaining journals may instead be carried out independently after the volume data copying process of Step S360.

Figure 24:
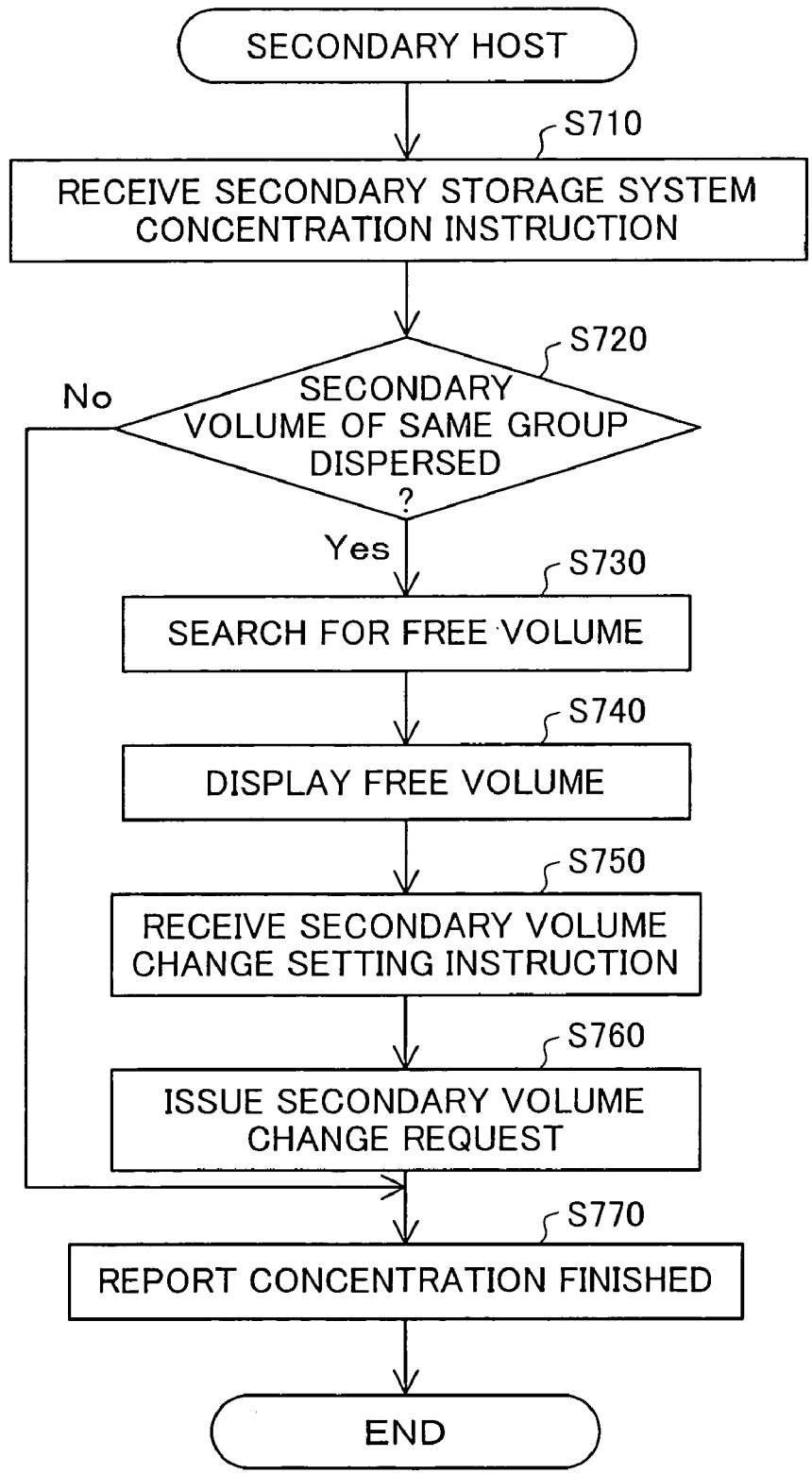
FIG. 24 is a flowchart showing the flow of the process of the secondary host computer 100S in the secondary volume change process in Embodiment 5.

FIG. 24 is a flowchart showing the flow of the process of the secondary host computer 100S in the secondary volume change process in Embodiment 5. In Embodiment 5, the secondary host 100S issues a secondary volume change request, for the purpose of concentrating the secondary storage systems. Here, concentration of secondary storage systems refers to consolidating the secondary volumes of copy pairs belonging to a given copy group, into volumes 272 contained in a given secondary storage system 200S, to concentrate the secondary storage systems 200S that execute the remote copying process in copy pairs belonging to the copy group.

In Step S710, the storage system management program 122 (FIG. 2) of the secondary host 100S receives a secondary storage system concentration instruction from the user. This concentration instruction includes a group identifier that identifies a target copy group. In Step S720, the storage system management program 122 determines whether secondary volumes of copy pairs belonging to the target copy group are dispersed among multiple secondary storage systems 200S. If in Step S720 it is determined that they are not dispersed, the process advances to Step S770. If on the other hand in Step S720 it is determined that they are dispersed, the process advances to Step S730.

In Step S730, the storage system management program 122 of the secondary host 100S refers to the volume information 232 of the secondary storage systems 200S to search for a free volume. In Step S740, the storage system management program 122 displays found free volumes on the display device 140 (FIG. 1). At this time, in order to assist the user in selecting the post-change secondary volume, the status (e.g. cache memory 240 load etc.) of each secondary storage system 200S having a free volume may be displayed as well.

In Step S750, the storage system management program 122 of the secondary host 100S receives from the user a secondary volume change setting instruction. The secondary volume change setting instruction includes a target copy pair OPr setting instruction and a post-change secondary volume setting instruction.

In Step S760, in accordance with the received secondary volume change setting, a secondary volume change request is issued to the pre-change secondary storage system 200S. Subsequently, the secondary volume change process shown in FIG. 22 is executed in the storage systems 200. In Step S770, completion of the secondary volume change process is received, and the user is notified that secondary volume change concentration has been completed.

As described above, in the secondary volume change process in Embodiment 5, secondary volumes of copy pairs belonging to a given copy group are consolidated into volumes 272 contained in the same given secondary storage system 200S, so that the concentration of secondary storage systems can be executed. Thus, by carrying out the secondary volume change process in Embodiment 5, the need is obviated for communication among secondary storage systems 200S at the time of journal reflection, for more efficient remote copying.

F. Embodiment 6

Figure 25:
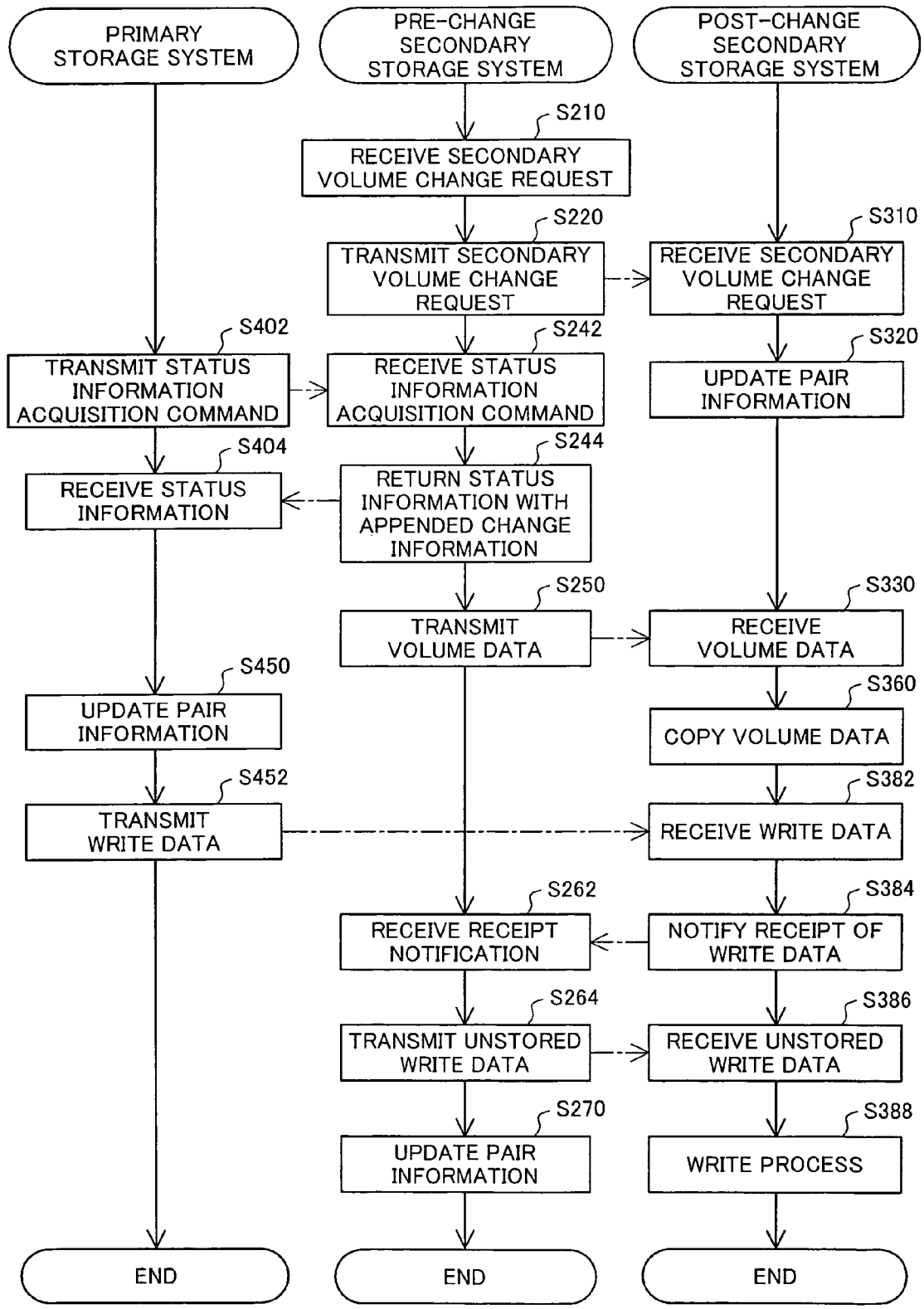
FIG. 25 is a flowchart showing the flow of the secondary volume change process in the data processing system 10d in Embodiment 6.

FIG. 25 is a flowchart showing the flow of the secondary volume change process in the data processing system 10d in Embodiment 6. The processes of the primary storage system 200P and the secondary storage systems 200S in the secondary volume change process are shown in FIG. 25. FIG. 26 is a diagram showing the outline of the secondary volume change process in the data processing system 10d in Embodiment 6.

In the data processing system 10d in Embodiment 6, the method for carrying out remote copying differs from that in Embodiment 1. Specifically, during remote copying in the data processing system 10 in Embodiment 1, as shown in FIG. 9, the primary storage system 200P transmits a journal to a secondary storage system 200S in response to a Journal Read command received from the secondary storage system 200S, whereby write data to the primary volume is sent to the secondary storage system 200S. During remote copying in the data processing system 10d in Embodiment 6, by contrast, the primary storage system 200P autonomously transmits write data stored in the primary volume to a secondary storage system 200S. The secondary storage system 200S stores in a secondary volume the write data received from the primary storage system 200P. The secondary volume change process in Embodiment 6 is a process for carrying out change of the secondary volume in a target copy pair OPr, in the data processing system 10d that carries out remote copying in this manner.

In FIG. 25, the process of the primary storage system 200P is shown at left, the process of a pre-change secondary storage system 200S (secondary storage system 200S1) is shown at middle, and the process of a post-change secondary storage system 200S (secondary storage system 200S2) is shown at right. In FIG. 25 steps assigned the same symbols as steps in the secondary volume change process in Embodiment 1 (FIG. 12 and FIG. 13) have content identical to that of the steps in Embodiment 1.

In Step S402, the copy process program 235P (FIG. 2) of the primary storage system 200P transmits a status information acquisition request to the pre-change secondary storage system 200S1, and in Step S242, the copy process program 235S (FIG. 7) of the pre-change secondary storage system 200S1 receives the status information acquisition request. Here, status information refers to information indicating load on the secondary storage systems 200S and so on.

In Step S244, the copy process program 235S of the pre-change secondary storage system 200S1 appends the change information 234 (FIG. 8) to status information and transmits the status information. In Step S404, the copy process program 235P of the primary storage system 200P receives the status information. In Step S450, as in Embodiment 1, the pair information update module 236P of the primary storage system 200P updates the pair information 231P. Subsequent to updating of the pair information 231P, the write data to the secondary storage system 200S from the primary storage system 200P is sent to the post-change secondary storage system 200S2 (Step S452).

In Step S382, the copy process program 235S (FIG. 7) of the post-change secondary storage system 200S2 receives the write data transmitted from the primary storage system 200P. In Step S384, the secondary volume change process module 237S of the post-change secondary storage system 200S2 notifies the pre-change secondary storage system 200S1 that it has received the write data, and in Step S262 the copy process program 235S of the pre-change secondary storage system 200S1 receives the notification.

In Step S264, the copy process program 235S of the pre-change secondary storage system 200S1 transmits unstored write data to the post-change secondary storage system 200S2. After receiving the secondary volume change request in Step S210, the pre-change secondary storage system 200S1, even when having received write data from the primary storage system 200P, does not store it in a data volume, but instead holds it in the cache memory 240. Unstored write data refers to this kind of data held by the pre-change secondary storage system 200S1 without being stored in a data volume. At the point in time of Step S264, since the post-change secondary storage system 200S2 has received the write data (see Step S384), subsequently, write data will not be transmitted to the pre-change secondary storage system 200S1.

In Step S386, the secondary volume change process module 237S of the post-change secondary storage system 200S2 receives the unstored write data. In Step S388, the secondary volume change process module 237S stores the unstored write data and the write data received in Step S382 in a data volume. Subsequently, the primary storage system 200P transmits the write data to the post-change secondary storage system 200S2, and writing of the data is performed in the post-change secondary storage system 200S2.

As described above, with the secondary volume change process in Embodiment 6, change of the secondary volume in a copy pair can be carried out in a data processing system 10d in which the primary storage system 200P performs remote copying by autonomously transmitting write data of secondary storage systems 200S.

G. Variations

The present invention is not limited to the embodiments and aspects described above. The present invention may be worked in various aspects within limits that involve no departure from the spirit of the invention; for example, the following variations are possible.

G1. Variation 1

The arrangements of the data processing systems 10 in the embodiments described above are merely exemplary, other arrangements for the data processing system 10 can be adopted. For example, whereas in the preceding embodiments the data processing system 10 is composed of two sites, namely a primary site and a secondary site, the data processing system 10 may instead be composed of a single site, or of three or more sites. Also, the number of storage systems 200 at each site in the embodiments may be modified arbitrarily.

G2. Variation 2

Content of the various kinds of information, such as the pair information 121 (FIG. 3), in the embodiments is merely exemplary; the various kinds of information may have other content, or some of the content of the various kinds of information described in the embodiments may be dispensed with. For example, where copy groups are not set in the data processing system 10, the copy group identifier included in the pair information 121 may be omitted.

G3. Variation 3

Whereas in the embodiments hereinabove, the pre-change secondary volume and post-change secondary volume are volumes 272 contained in different secondary storage systems 200S, the pre-change volume and post-change volume may instead be volumes 272 contained in the same secondary storage system 200S.

G4. Variation 4

The method for carrying out initial copying between the pre-change secondary volume and post-change secondary volume in the embodiments hereinabove is merely exemplary, it being possible to employ some other method. Specifically, whereas in the preceding embodiments, once the pre-change secondary storage system 200S has reflected unreflected journals in the pre-change secondary volume, the data of the pre-change secondary volume is transferred to the post-change secondary storage system 200S (Steps S230 through S250 of FIG. 12), it would be acceptable instead to transfer the data of the pre-change secondary volume and unreflected journals to the post-change secondary storage system 200S without first carrying out reflection of unreflected journals in the pre-change secondary storage system 200S, and to then execute reflection of the unreflected journals in the post-change secondary storage system 200S. Alternatively, the pre-change secondary storage system 200S may transfer the pre-change secondary volume data and the largest sequence number of already reflected journals to the post-change secondary storage system 200S, whereupon the post-change secondary storage system 200S appends the largest sequence number of already reflected journals and issues a Journal Read command to the primary storage system 200P, and executes reflection. Similarly, the pre-change secondary storage system 200S may transfer the largest sequence number of already reflected journals to the post-change secondary storage system 200S, whereupon the post-change secondary storage system 200S receives all journals remaining in the journal volume of the primary storage system 200P, and referring to the largest sequence number of already reflected journals, executes reflection of the journal to be reflected.

G5. Variation 5

Whereas in the embodiments hereinabove, sending of change information 234 from secondary storage systems 200S to the primary storage system 200P was carried out through a process executed during ordinary remote copying, sending of change information 234 to the primary storage system 200P may instead be carried out as an independent process.

What is claimed is:

1. A data processing system comprising:
    at least one first storage system; and
    at least one second storage system connected to the first storage system,
    wherein copying of data is carried out in a copy pair composed of one storage area as a copy source storage area belonging to the first storage system and one storage area as a copy destination storage area belonging to the second storage system, the second storage system includes:
        a copy processing module configured to receive from the first storage system a copy of data stored in a copy source storage area and store the received copy of data in a copy destination storage area in sequence matching storage sequence in the copy source storage area;
        a change information receiving module configured to receive change information identifying pre-change and post-change copy destination storage areas in a change process for changing a copy destination storage area of a target copy pair that is one of the copy pairs to another storage area belonging to the second storage system;
        a change information transmitting module configured to transmit the change information to the first storage system having a copy source storage area in the target copy pair;
        a copy information transmitting module configured to transmit copy information including data stored in the pre-change copy destination storage area in order to perform copying of data between the pre-change and post-change copy destination storage areas in association with the change process; and
        a change copy processing module configured to perform copying of data between the pre-change and post-change copy destination storage areas using the transmitted copy information, and
    the first storage system includes:
        a copy transmitting module configured to transmit a copy of data stored in a copy source storage area in a copy pair to the second storage system having a copy destination storage area referring to pair information identifying the copy source storage area and the copy destination storage area in the copy pair; and
        a pair information updating module configured to update the pair information according to the change information received from the second storage system.

2. A data processing system according to claim 1, wherein the data processing system comprises a plurality of the second storage systems, and the pre-change and post-change copy destination storage areas in the target copy pair are respectively included in different second storage systems.

3. A data processing system according to claim 2, further comprising
    a computer connected to the second storage system,
    wherein the computer includes a change request issuing module configured to issue a change request instructing execution of the change process with the change information to the second storage system.

4. A data processing system according to claim 3, wherein the computer further includes a change necessity determination module configured to determine whether the change process is necessary for a copy pair, and
    the change request issuing module of the computer issues the change request when the change necessity determination module has determined that the change process is necessary.

5. A data processing system according to claim 4, wherein the change necessity determination module of the computer determines that the change process is necessary where at least one of the following cases applies:
    (i) an additional second storage system has been newly installed;
    (ii) a load on the second storage system having a copy destination storage area in a copy pair exceeds a predetermined threshold value; and
    (iii) communication speed between the second storage system having a copy destination storage area in a copy pair and the first storage system having a copy source storage area is below a predetermined threshold value.

6. A data processing system according to claim 3, wherein the first storage system further includes an update information storage area for storing update information that includes a copy of data stored in a copy source storage area and information indicating storage sequence of the data in the copy source storage area,
    the change information transmitting module of the second storage system includes an update information request issuing module configured to issue to the first storage system an update information request requesting transmission of the update information and transmit the change information with the update information request appended thereto, and
    the copy transmitting module of the first storage system, upon receiving the update information request, transmits the update information stored in the update information storage area as a copy of the data.

7. A data processing system according to claim 6, wherein the copy information includes the update information, relating to the target copy pair, received by the second storage system having the pre-change copy destination storage area in the target copy pair.

8. A data processing system according to claim 6, wherein a copy group composed of multiple copy pairs is established such that storage sequence of data in multiple copy destination storage areas included in the multiple copy pairs matches storage sequence in multiple copy source storage areas included in the multiple copy pairs, the computer further includes a determination module configured to determine whether there is a spanning copy group in which copy destination storage areas in multiple copy pairs belonging to the spanning copy group are placed spanning a plurality of the second storage systems, and the change request issuing module of the computer, when the determination module determine that the spanning copy group exists, issues the change request requesting execution of the change process such that copy destination storage areas in the multiple copy pairs belonging to the spanning copy group are to be placed in the single second storage system.

9. A data processing system according to claim 6, wherein the change request issuing module of the computer issues the change request to the second storage system having the pre-change copy destination storage area in the target copy pair, and the change request receiving module of the second storage system transmits the received change request to the second storage system having the post-change copy destination storage area in the target copy pair.

10. A data processing system according to claim 6, further comprising a third storage system connected to the first storage system, wherein a copy source storage area in the target copy pair belonging to the first storage system is a copy destination storage area in another copy pair constituted together with one storage area belonging to the third storage system.

11. A storage system having storage areas comprising:

a data processor; and a memory having stored thereon computer program code, the computer program code comprising:

a copy processing module configured to cause the data processor, in a copy pair composed of one storage area as a copy source storage area belonging to the storage system and one storage area as a copy destination storage area belonging to a first other storage system, to receive from the first other storage system a copy of data stored in a copy source storage area of the first other storage system and to store the received copy of data in a copy destination storage area in sequence matching storage sequence in the copy source storage area;

a change information receiving module configured to cause the data processor to receive change information identifying pre-change and post-change copy destination storage areas in a change process for changing a copy destination storage area of a target copy pair that is one of the copy pairs to one storage area belonging to a second other storage system;

a change information transmitting module configured to cause the data processor to transmit the change information to the first other storage system having a copy source storage area in the target copy pair; and a copy information transmitting module configured to cause the data processor to transmit copy information including data stored in the pre-change copy destination storage area in order to perform copying of data between the pre-change and post-change copy destination storage areas in association with the change process.

12. A storage area change process method for use in a data processing system including at least one first storage system and at least one second storage system connected to the first storage system, copying of data being carried out in a copy pair composed of one storage area as a copy source storage area belonging to the first storage system and one storage area as a copy destination storage area belonging to the second storage system, the storage area change process being process for changing a copy destination storage area of a target copy pair that is one of the copy pairs to another storage area belonging to the second storage system, the method comprising the steps of:

(a) receiving from the first storage system a copy of data stored in a copy source storage area and storing the received copy of data in a copy destination storage area in sequence matching storage sequence in the copy source storage area by the second storage system;

(b) receiving change information that identifies pre-change and post-change copy destination storage areas in the storage area change process by the second storage system;

(c) transmitting the change information to the first storage system having a copy source storage area in the target copy pair by the second storage system;

(d) transmitting copy information including data stored in the pre-change copy destination storage area in order to perform copying of data between the pre-change and post-change copy destination storage areas in association with the storage area change process by the second storage system;

(e) performing copying of data between the pre-change and post-change copy destination storage areas using the transmitted copy information by the second storage system;

(f) transmitting a copy of data stored in a copy source storage area in a copy pair to the second storage system having a copy destination storage area referring to pair information that identifies the copy source storage area and the copy destination storage area in the copy pair by the first storage system; and (g) updating the pair information according to the change information received from the second storage system by the first storage system.

* * * * *